US012744284B2

(12) United States Patent
Takamori et al.

(10) Patent No.: US 12,744,284 B2
(45) Date of Patent: Sep. 22, 2026

(54) SEPARATOR FOR POWER STORAGE DEVICE, AND POWER STORAGE DEVICE INCLUDING SAME

(71) Applicant: Asahi Kasei Battery Separator Corporation, Tokyo (JP)

(72) Inventors: Hitoshi Takamori, Tokyo (JP); Mayu Kidena, Tokyo (JP); Kazushi Misawa, Tokyo (JP)

(73) Assignee: Asahi Kasei Battery Separator Corporation, Tokyo (JP)

( * ) Notice: Subject to any disclaimer, the term of this patent is extended or adjusted under 35 U.S.C. 154(b) by 602 days.

(21) Appl. No.: 18/038,261

(22) PCT Filed: Nov. 30, 2021

(86) PCT No.: PCT/JP2021/043927
§ 371 (c)(1),
(2) Date: May 23, 2023

(87) PCT Pub. No.: WO2022/114228
PCT Pub. Date: Jun. 2, 2022

(65) Prior Publication Data
US 2024/0006716 A1 Jan. 4, 2024

(30) Foreign Application Priority Data
Nov. 30, 2020 (JP) ................................ 2020-198917

(51) Int. Cl.
*H01M 50/00* (2021.01)
*H01G 9/02* (2006.01)
(Continued)

(52) U.S. Cl.
CPC ............ *H01M 50/446* (2021.01); *H01G 9/02* (2013.01); *H01M 50/417* (2021.01);
(Continued)

(58) Field of Classification Search
CPC .. H01M 50/463; H01M 50/44; H01M 50/411; H01M 10/0525; Y02E 60/10
See application file for complete search history.

(56) References Cited

U.S. PATENT DOCUMENTS

2011/0159347 A1 6/2011 Shibano et al.
2012/0202102 A1 8/2012 Kakibe et al.
(Continued)

FOREIGN PATENT DOCUMENTS

CN 105958000 A 9/2016
CN 106252565 A 12/2016
(Continued)

OTHER PUBLICATIONS

Zhao, et al.,A multilayer porous membrane for lithium ion battery , Dec. 2016, See the Abstract. (Year: 2016).*
(Continued)

*Primary Examiner* — Tiffany Legette
*Assistant Examiner* — Monique M Wills
(74) *Attorney, Agent, or Firm* — Morgan, Lewis & Bockius LLP

(57) ABSTRACT

The present disclosure provides: a separator which is for a power storage device and has high adhesive force to an electrode and a small thermal shrinkage rate; and a power storage device including the same. A separator for a power storage device according to the present disclosure comprises: a base material of a polyolefin microporous film; and a coating layer disposed on at least one surface of the base material, wherein the coating layer contains an inorganic filler and a particulate polymer protruding to a position that corresponds to at least 0.1 times the thickness of the coating layer.

17 Claims, 2 Drawing Sheets

(51) Int. Cl.

| | |
|---|---|
| ***H01M 50/417*** | (2021.01) |
| ***H01M 50/42*** | (2021.01) |
| ***H01M 50/446*** | (2021.01) |
| ***H01M 50/449*** | (2021.01) |
| ***H01M 50/489*** | (2021.01) |

(52) U.S. Cl.

CPC ......... *H01M 50/42* (2021.01); *H01M 50/449* (2021.01); *H01M 50/489* (2021.01)

(56) References Cited

U.S. PATENT DOCUMENTS

| | | | | |
|---|---|---|---|---|
| 2013/0122392 | A1* | 5/2013 | Thery | H01M 8/0202 429/465 |
| 2016/0149186 | A1 | 5/2016 | Kim et al. | |
| 2017/0283565 | A1 | 10/2017 | Ono et al. | |
| 2018/0048008 | A1 | 2/2018 | Johnston et al. | |
| 2019/0140242 | A1 | 5/2019 | Miyazawa et al. | |
| 2020/0299474 | A1 | 9/2020 | Tsukao | |
| 2022/0173479 | A1 | 6/2022 | Han et al. | |
| 2022/0190439 | A1 | 6/2022 | Tanaka | |
| 2022/0416362 | A1 | 12/2022 | Taguchi | |

FOREIGN PATENT DOCUMENTS

| | | | | | |
|---|---|---|---|---|---|
| CN | 106252571 | A | * | 12/2016 | H01M 50/463 |
| JP | 2010-244875 | A | | 10/2010 | |
| JP | 2012-109123 | A | | 6/2012 | |
| JP | 2015-228358 | A | | 12/2015 | |
| JP | 2017-107851 | A | | 6/2017 | |
| JP | 2019-169336 | A | | 10/2019 | |
| JP | 2019-179698 | A | | 10/2019 | |
| KR | 10-2016-0118979 | A | | 10/2016 | |
| KR | 10-2020-0112749 | A | | 10/2020 | |
| TW | 201719957 | A | | 6/2017 | |
| WO | 2018/074318 | A1 | | 4/2018 | |
| WO | 2019/089492 | A1 | | 5/2019 | |
| WO | 2019/143483 | A1 | | 7/2019 | |
| WO | 2020/175079 | A1 | | 9/2020 | |
| WO | WO-2021006357 | A1 | * | 1/2021 | B32B 27/32 |
| WO | 2021/085144 | A1 | | 5/2021 | |

OTHER PUBLICATIONS

Uchida et al., Multilayer Porous Membrane1—2021, See the Abstract. (Year: 2021).*

International Search Report issued in corresponding International Patent Application No. PCT/JP2021/043927 dated Feb. 15, 2022.

International Preliminary Report on Patentability and Written Opinion issued in corresponding International Patent Application No. PCT/JP2021/043927 dated Jun. 15, 2023.

Supplementary European Search Report issued in European Patent Application No. 21898199.1 dated Jan. 27, 2025.

* cited by examiner

SEPARATOR FOR POWER STORAGE DEVICE, AND POWER STORAGE DEVICE INCLUDING SAME

FIELD

The present disclosure relates to a separator for a power storage device and to a power storage device comprising the same.

BACKGROUND

Power storage devices such as lithium ion secondary batteries are currently being actively developed. A power storage device generally comprises a positive electrode, a negative electrode, and a microporous membrane separator situated between them. The separator has the function of preventing direct contact between the positive electrode and negative electrode, while also allowing ions to pass through the electrolyte solution that is held in the micropores. A separator must exhibit safety performance including rapid termination of the battery reaction upon abnormal heating (fuse characteristic), and shape maintenance even at high temperatures to prevent the danger of direct reaction between the positive electrode and negative electrode (short circuit characteristic).

In recent years, techniques in which a laminated stack comprising electrodes and a separator is hot pressed, or a laminated stack comprising electrodes and a separator is wound into a wound body and hot pressed in order to reduce the volume of the power storage device, have been implemented with the purpose of achieving higher capacity power storage devices. One known technique that is employed to anchor the electrodes and separator after hot pressing to maintain the pressed volume, is to dispose on the separator a covering layer that comprises a thermoplastic polymer exhibiting an adhesive function under prescribed conditions, in order to increase adhesion between the separator and the electrodes.

For example, PTL 1 describes a separator having a porous coating layer that includes organic polymer particles, the purpose being to reinforce safety by increasing bonding strength between the separator and electrodes to achieve stronger integration between the separator and electrodes, without a step of humidified phase separation of the organic binder polymer or secondary coating of the adhesive layer. The separator has organic polymer particles that protrude to a height of 0.1 μm to 3 μm from the surface of the porous coating layer.

PTL 2 describes a separator provided with a surface coating that comprises polymer binder particles of different particle sizes, for the purpose of inhibiting power storage device deformation caused by expansion of the electrode volume during charging. The polymer binder particles of different particle sizes form voids that allow internal expansion of the power storage device between the separator and electrodes.

For further improvement of an existing separator and its production method, PTL 3 describes a separator having a composite coating that includes inorganic particles, polymer particles and a binder, for the purpose of obtaining satisfactory thermal stability performance and a satisfactory adhesive effect with electrodes, to thus ensure safety and flatness for a power storage device. The polymer particles are dispersed in the inorganic particles and protrude from the surfaces of the inorganic particles.

PTL 4 describes a separator provided with a functional layer that includes inorganic particles and polymer particles, for the purpose of obtaining excellent adhesion and heat resistance and improving fillability of the electrolyte solution. When its surface is viewed flat, the functional layer has over 90% per unit area of its area occupied by the inorganic particles, and the volume-average particle size of the polymer particles is in a fixed range, the volume-average particle size of the polymer particles being thicker than the inorganic particle layer.

PTL 5 describes a separator provided with a functional layer that includes inorganic particles and polymer particles, for the purpose of providing a functional layer for an electrochemical element that has excellent processing adhesion and can exhibit excellent cycle characteristics for an electrochemical element. The functional layer has a particle shedding portion, where the area ratio of the particle shedding portion is 0.1% to 40.0% of the total area of the polymer particles and particle shedding portion when the surface of the electrochemical element functional layer is viewed flat, the volume-average particle size of the polymer particles being thicker than the inorganic particle layer that contains the inorganic particles.

CITATION LIST

Patent Literature

[PTL 1] Korean Patent Publication No. 10-2016-0118979

[PTL 2] International Patent Publication No. WO2019/089492

[PTL 3] Chinese Patent Application Publication No. 105958000

[PTL 4] International Patent Publication No. WO2020/175079

[PTL 5] International Patent Publication No. WO2021/085144

SUMMARY

Technical Problem

In PTL 1 and PTL 3, however, an adhesive polymer of secondary particles is used, resulting in the problem of uneven distribution of the separator thickness. In addition, since the dispersibility is poor when the adhesive polymer has been coated, sections are created where the adhesive polymer is aggregated on the separator, producing irregularities in adhesive force with the electrodes and consequently lowering the overall adhesive force, while also impairing the heat resistance. In PTL 2, an inorganic filler-containing heat-resistant layer is not provided, and therefore sufficient heat resistance cannot be imparted to the separator. In PTLs 4 and 5, the binding force of the covering layer is insufficient, and therefore further modification is needed to inhibit powder falling during the process and improve the adhesive force with electrodes. It is an object of the present disclosure to provide a separator for a power storage device that solves these problems of separators, by exhibiting high adhesive force with electrodes and having a low heat shrinkage factor, as well as a power storage device comprising the same.

Solution to Problem

The following are examples of embodiments of the disclosure.

[1]

A separator for a power storage device that comprises a substrate which is a polyolefin microporous membrane including a polyolefin as a main component, and a covering layer disposed on at least one surface of the substrate, wherein:

the covering layer comprises an inorganic filler and polymer particles of a thermoplastic polymer, the amount of polymer particles in the covering layer is 1 part by weight to 50 parts by weight with respect to 100 parts by weight of the inorganic filler in the covering layer, the polymer particles include polymer particles protruding from the covering layer, to at least 0.1 times the thickness of the inorganic filler portion of the covering layer, and the covering layer is formed in an inclined manner so as to be thicker toward the protruding polymer particles.

[2]

The separator for a power storage device according to [1] above, wherein the average value for the slope L2/L1 of the covering layer is 1.2 or greater, where L1 is the thickness of the inorganic filler portion of the covering layer, and L2 is the maximum distance from the substrate-covering layer boundary to the outer surface of the inorganic filler of the covering layer formed in the inclined manner.

[3]

The separator for a power storage device according to [1] or [2] above, wherein the average value for the coverage factor (L2−L1)/(L3−L1) of the protruding section of the protruding polymer particles is 0.4 or greater, where L1 is the thickness of the inorganic filler portion of the covering layer, L2 is the maximum distance from the substrate-covering layer boundary to the outer surface of the inorganic filler of the covering layer formed in the inclined manner, and L3 is the maximum distance from the substrate-covering layer boundary to the outlines of the protruding polymer particles.

[4]

A separator for a power storage device that comprises a substrate which is a polyolefin microporous membrane including a polyolefin as a main component, and a covering layer disposed on at least one surface of the substrate, wherein:

the covering layer comprises an inorganic filler and polymer particles of a thermoplastic polymer, the amount of polymer particles in the covering layer is 1 part by weight to 50 parts by weight with respect to 100 parts by weight of the inorganic filler in the covering layer, the polymer particles include polymer particles protruding from the covering layer, to at least 0.1 times the thickness of the inorganic filler portion of the covering layer, and at least 20% of the protruding polymer particles contact with the surface of the substrate.

[5]

A separator for a power storage device that comprises a substrate which is a polyolefin microporous membrane including a polyolefin as a main component, and a covering layer disposed on at least one surface of the substrate, wherein:

the covering layer comprises an inorganic filler and polymer particles of a thermoplastic polymer, the amount of polymer particles in the covering layer is 1 part by weight to 50 parts by weight with respect to 100 parts by weight of the inorganic filler in the covering layer, the polymer particles include polymer particles protruding from the covering layer, to at least 0.1 times the thickness of the inorganic filler portion of the covering layer, and the covering layer has a 180° peel strength from the substrate of 200 gf/cm or greater.

[6]

A separator for a power storage device that comprises a substrate which is a polyolefin microporous membrane including a polyolefin as a main component, and a covering layer disposed on at least one surface of the substrate, wherein:

the covering layer comprises an inorganic filler and polymer particles of a thermoplastic polymer, the amount of polymer particles in the covering layer is 1 part by weight to 50 parts by weight with respect to 100 parts by weight of the inorganic filler in the covering layer, the polymer particles include polymer particles protruding from the covering layer, to at least 0.1 times the thickness of the inorganic filler portion of the covering layer, and the average number of protruding polymer particles adjacent to any one protruding polymer particle is less than 2.

[7]

A separator for a power storage device that comprises a substrate which is a polyolefin microporous membrane including a polyolefin as a main component, and a covering layer disposed on at least one surface of the substrate, wherein:

the covering layer comprises an inorganic filler and polymer particles of a thermoplastic polymer, the amount of polymer particles in the covering layer is 1 part by weight to 50 parts by weight with respect to 100 parts by weight of the inorganic filler in the covering layer, the polymer particles include polymer particles protruding from the covering layer, to at least 0.1 times the thickness of the inorganic filler portion of the covering layer, and the ratio of the mean particle size of the protruding polymer particles with respect to the mean particle size of the inorganic filler is greater than 10.

[8]

The separator for a power storage device according to any one of [1] to [7] above, wherein the number of protruding polymer particles is at least 50% of the total number of polymer particles in the covering layer.

[9]

The separator for a power storage device according to any one of [1] to [8] above, wherein the number of other protruding polymer particles present within a radius of 10 μm from any one protruding polymer particle is less than 60.

[10]

The separator for a power storage device according to any one of [1] to [9] above, wherein the separator for a power storage device has a methylene chloride-soluble portion of from 0.05 parts by weight to 0.80 parts by weight with respect to the total weight of the separator for a power storage device.

[11]

The separator for a power storage device according to any one of [1] to [10] above, wherein the total amount of metal cations in the covering layer is 0.1 ppm to 100 ppm, based on the total weight of the covering layer.

[12]

The separator for a power storage device according to any one of [1] to [11] above, wherein the covering layer includes a water-soluble polymer.

[13]

The separator for a power storage device according to [12] above, wherein the amount of water-soluble polymer is 0.04 parts by weight or greater and less than 2 parts by weight with respect to 100 parts by weight of the inorganic filler.

[14]

The separator for a power storage device according to any one of [1] to [13] above, wherein either one of the covering layer disposed on at least one side of the substrate has a thickness of 0.3 μm to 1.3 μm.

[15]

The separator for a power storage device according to any one of [1] to [14] above, wherein the polymer particles include at least one copolymer selected from the group consisting of copolymers containing (meth)acrylate as a monomer, styrene-butadiene copolymer, and fluorine atom-containing copolymers.

[16]

The separator for a power storage device according to any one of [1] to [15] above, wherein the polymer particles comprise a copolymer including (meth)acrylic acid, butyl (meth)acrylate and ethylhexyl (meth)acrylate as monomers.

[17]

The separator for a power storage device according to any one of [1] to [16] above, wherein the polymer particles comprise a copolymer including a polyfunctional (meth) acrylate as a monomer.

[18]

The separator for a power storage device according to any one of [1] to [17] above, wherein the polymer particles are primary particles.

[19]

The separator for a power storage device according to [18] above, wherein the primary particles has a mean particle size of 1 μm to 10 μm.

[20]

The separator for a power storage device according to any one of [1] to [19] above, wherein the heat shrinkage factor in the TD direction at 130° C. for 1 hour is 5% or lower.

[21]

The separator for a power storage device according to any one of [1] to [20] above, wherein the heat shrinkage factor in the TD direction at 150° C. for 1 hour is 5% or lower.

[22]

A power storage device comprising a separator for a power storage device according to any one of [1] to [21] above.

Advantageous Effects of Invention

The present disclosure provides a separator for a power storage device that exhibits high adhesive force with electrodes and has a low heat shrinkage factor, as well as a power storage device comprising the same.

DESCRIPTION OF EMBODIMENTS

Figure 1:
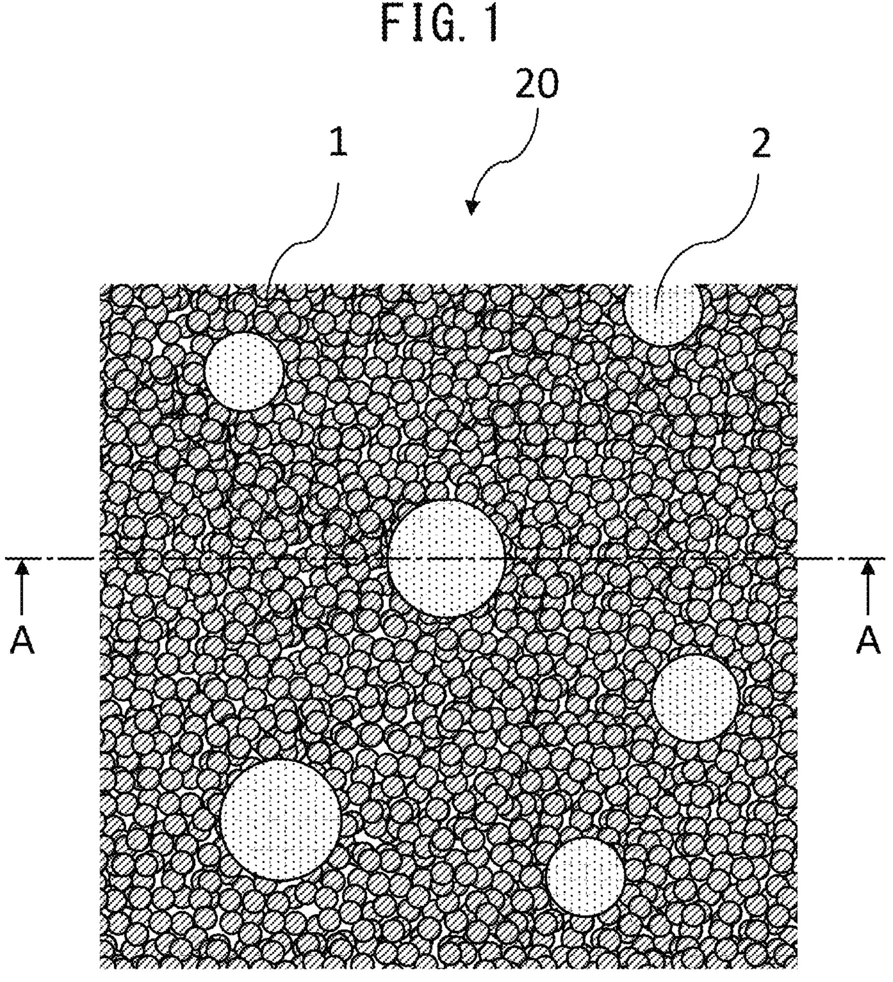
FIG. 1 is a schematic view showing the surface of the covering layer on a separator for a power storage device according to an embodiment of the invention.

An exemplary embodiment for of the disclosure (hereunder abbreviated as "embodiment") will now be described in detail, with the understanding that the disclosure is not limited to the embodiment.

Separator for Power Storage Device

The separator for a power storage device of the embodiment comprises a substrate which is a polyolefin microporous membrane including a polyolefin as a main component, and a covering layer disposed on at least one surface of the substrate. The covering layer comprises an inorganic filler and polymer particles composed of a thermoplastic polymer.

Amount of Polymer Particles

The amount of polymer particles is preferably 1 part by weight to 50 parts by weight, more preferably 3 parts by weight to 50 parts by weight, even more preferably 5 parts by weight to 30 parts by weight and yet more preferably 10 parts by weight to 25 parts by weight, with respect to 100 parts by weight of the inorganic filler. If the amount of polymer particles is 1 part by weight to 50 parts by weight it will be possible to increase the adhesive force with electrodes while maintaining ion permeability. The amount is preferably 10 parts by weight or lower from the viewpoint of improving the heat shrinkage resistance.

Protrusion of Polymer Particles

The polymer particles include polymer particles protruding from the covering layer, to at least 0.1 times the thickness of the inorganic filler portion of the covering layer. The phrase "thickness of the inorganic filler portion of the covering layer" means the distance between the surface of the polyolefin microporous membrane and the outermost surface of the laminated layer of accumulated inorganic filler (the inorganic filler layer), and it is measured from an SEM photograph of the covering layer cross-section. The term "inorganic filler portion" means the portion without the polymer particles, separated by at least 1.5D (where the diameter of each protruding polymer particles is represented by D) in the horizontal direction (the in-plane direction of the covering layer) from the center of each protruding polymer particle. The measuring conditions will be explained in the Examples. If protrusion of the polymer particles is to at least 0.1 times the thickness of the inorganic filler portion of the covering layer, it will be possible to increase adhesive force with electrodes. In addition, if protrusion of the polymer particles is to at least 0.1 times the thickness of the inorganic filler portion of the covering layer, voids will be formed between the separator and electrodes. The voids can alleviate the effect of internal expansion taking place with charge-discharge of the power storage device, helping to reduce strain on the wound body and improve the cycle characteristic. From this viewpoint, the protrusion of the polymer particles may be at least 0.2 times and preferably at least 0.3 times the aforementioned thickness. From the viewpoint of preventing the polymer particles from being shed from the separator, the protrusion of the polymer particles is preferably not more than 5 times, and more preferably not more than 4 times, not more than 3 times, not more than 2 times, not more than equal to or not more than 0.4 times the aforementioned thickness.

The term "protrusion" as used herein means that the polymer particles protrude toward the surface side of the covering layer, exceeding the "thickness of the inorganic filler portion of the covering layer". At the portions of protrusion of the polymer particles (hereunder also referred to as "protruding sections") it is not necessary for the polymer particles to be exposed on the surface of the covering layer, and the protruding sections may be either at least partially or fully covered by inorganic filler. From the viewpoint of preventing the polymer particles from being shed from the covering layer to obtain higher adhesive force, preferably at least parts of the perimeter edges of the protruding sections are covered with inorganic filler. From the viewpoint of ensuring contact area between the polymer particles and electrodes to obtain higher adhesive force, the center sections of the protruding sections are preferably exposed at the surface of the covering layer.

Inclined Shape of Covering Layer, Contact Ratio Between Polymer Particles and Substrate, 1800 Peel Strength, Average Number of Adjacent Polymer Particles, and Proportion of Mean Particle Size The separator for a power storage device of the embodiment is characterized by one or more of the following features (1) to (5): (1) the covering layer is formed in an inclined manner so as to be thicker toward the protruding polymer particles; (2) at least 20% of the protruding polymer particles contact with the surface of the substrate; (3) the 180° peel strength of the covering layer from the substrate (hereunder also referred to simply as "180° peel strength") is 200 gf/cm or greater; (4) the average number of protruding polymer particles adjacent to any one protruding polymer particle (hereunder also referred to simply as "average number of adjacent polymer particles") is less than 2; and (5) the ratio of the mean particle size of the protruding polymer particles with respect to the mean particle size of the inorganic filler, i.e. the ratio calculated as (particulate polymer mean particle size/inorganic filler mean particle size) (hereunder also referred to simply as "mean particle size ratio") is greater than 10. With at least one of the aforementioned features (1) to (5), it is possible to provide a separator for a power storage device having high adhesive force with electrodes and a low heat shrinkage factor.

Feature (1):

According to the first embodiment, the separator for a power storage device has the covering layer formed in an inclined manner so as to be thicker toward the protruding polymer particles. This prevents shedding of the polymer particles from the covering layer and increases the adhesive force with electrodes. As used herein, the term "inclined" means that the average value for the slope L2/L1 of the covering layer is 1.1 or greater, where L1 is the thickness of the inorganic filler portion of the covering layer, and L2 is the maximum distance from the substrate-covering layer boundary to the outer surface of the inorganic filler of the covering layer formed in the inclined manner. The relationship between L1 and L2 can be seen in the schematic diagram of FIG. 2, as an example. The inclination is preferably such that the thickness of the covering layer varies in a continuous manner with the covering layer gradually thickening toward the protruding polymer particles, and preferably without any discontinuous change where the covering layer is absent. If there is no absence of the covering layer, the heat resistance and cycle characteristic will tend to be improved. The inclination may be gentle away from the protruding polymer particles, and more rapid as it approaches the protruding sections of the protruding polymer particles. When the inorganic filler covers at least part or all of the protruding sections, the inclination on the protruding sections may return to gentle inclination toward the centers of the protruding sections. The average value for the slope L2/L1 of the covering layer is preferably 1.2 or greater, 1.3 or greater, 1.4 or greater, 1.5 or greater or 1.7 or greater.

If the covering layer is formed in an inclined manner so as to be thicker toward the protruding polymer particles, then the inorganic filler may cover at least part or all of the protruding sections riding up along the outlines of the polymer particles. The inorganic filler preferably covers parts of the perimeter edges of the protruding sections in a manner riding along the outlines of the polymer particles. The areas near the centers of the protruding sections are also preferably exposed on the surface of the covering layer. If the maximum distance from the substrate-covering layer boundary to the outlines of the protruding polymer particles (the distance to the most distant point from each substrate-covering layer boundary along the protruding polymer particle outline) is represented as L3, then the average value of the coverage factor (L2−L1)/(L3−L1) for the protruding sections is preferably 0.4 or greater. The relationship between L1, L2 and L3 can be seen in the schematic diagram of FIG. 2, as an example. If the average value of the slope L2/L1 is 1.1 or greater and the average value for the coverage factor (L2−L1)/(L3−L1) is 0.4 or greater, then shedding of the polymer particles from the covering layer will be prevented and adhesive force with electrodes will be increased. There is no particular restriction on the upper limit for the average value of the slope L2/L1, but from the viewpoint of ensuring bonding area between the polymer particles and electrodes and increasing adhesive force with electrodes, it may be 5.0 or lower, 4.0 or lower, 3.0 or lower, 2.8 or lower, 2.5 or lower, 2.3 or lower, 2.0 or lower or 1.8 or lower. The upper limit for the coverage factor (L2−L1)/(L3−L1) is preferably less than 1.0, or 0.9 or lower, 0.8 or lower or 0.7 or lower. A coverage factor of 1.0 or greater means that the inorganic filler riding on the protruding parts of the polymer particles reaches to the uppermost sections of the outlines of the protruding polymer particles (the furthest points from the substrate-covering layer boundaries). A coverage factor of less than 1.0 will ensure contact area between the polymer particles and electrodes, and will increase adhesive force with electrodes. A coverage factor of 0.8 or lower will further increase contact area between the polymer particles and electrodes, and further increase adhesive force with electrodes.

Feature (2):

According to a second embodiment, the separator for a power storage device has a contact ratio of 20% or greater, preferably 50% or greater and more preferably 70% or greater, between the polymer particles protruding from the covering layer and the substrate surface in the covering layer. The "contact ratio" is calculated from an image of a cross-section of the covering layer of the separator for a power storage device taken by SEM. Increasing the polymer particles protruding from the covering layer and contacting with the substrate will further increase the binding force between the substrate and polymer particles, improve the 1800 peel strength, and increase the adhesive force with electrodes. The upper limit for the contact ratio between the polymer particles protruding from the covering layer and the substrate surface in the covering layer is not particularly restricted, and may be smaller than 100%, or 100%.

Feature (3):

According to a third embodiment, the separator for a power storage device has a 1800 peel strength of 200 gf/cm or greater, preferably 230 gf/cm or greater and more preferably 250 gf/cm or greater. The "180° peel strength" is the strength when the covering layer has been peeled in a manner so that the surface facing the substrate of the covering layer forms a 180° angle with respect to the substrate. A 180° peel strength of 200 gf/cm or greater increases the adhesive force with electrodes and inhibits heat shrinkage. The upper limit for the 180° peel strength is not particularly restricted and may be 500 gf/cm or lower.

Feature (4):

According to a fourth embodiment, the separator for a power storage device has an average number of adjacent polymer particles of less than 2, and preferably less than one. The term "adjacent" means that the shortest distance between the outer edge of one polymer particle and the outer edge of another polymer particle is 0.2 μm or smaller, based on an image of the covering layer surface of the separator for a power storage device taken by SEM. An average number of adjacent polymer particles of less than 2 means that the polymer particles are uniformly dispersed throughout the covering layer, thus improving the 180° peel strength, increasing the adhesive force with electrodes, inhibiting heat shrinkage and ensuring uniformity for the covering layer thickness. The lower limit for the average number of adjacent polymer particles is not particularly restricted, and may be greater than 0, or 0.

Feature (5):

According to a fifth embodiment, the separator for a power storage device has a ratio of greater than 10 for the mean particle size of the protruding polymer particles with respect to the mean particle size of the inorganic filler. The "mean particle size" is measured from an image of the surface of the covering layer of the separator for a power storage device taken by SEM. The measuring conditions will be explained in the Examples. If the mean particle size ratio is greater than 10, then the polymer particles will tend to form a structure that protrudes from the surface of the covering layer, resulting in higher adhesive force with electrodes and inhibited heat shrinkage. From the viewpoint of obtaining both permeability and adhesive force for the separator, the upper limit for the mean particle size ratio is preferably 50 or smaller, more preferably 35 or smaller, and even more preferably 25 or smaller, 22 or smaller or 20 or smaller.

The separator for a power storage device of the embodiment may have any combination of the aforementioned features (1) to (5), such as a combination of: (1) and (2); (1) and (3); (1) and (4); (1) and (5); (2) and (3); (2) and (4); (2) and (5); (3) and (4); (3) and (5); (4) and (5); (1), (2) and (3); (1), (2) and (4); (1), (2) and (5); (1), (3) and (4); (1), (3) and (5); (1), (4) and (5); (2), (3) and (4); (2), (3) and (5); (2), (4) and (5); (3), (4) and (5); (1), (2), (3) and (4); (1), (2), (3) and (5); (1), (2), (4) and (5); (1), (3), (4) and (5); (2), (3), (4) and (5); or (1), (2), (3), (4) and (5). From the viewpoint of higher adhesive force and lower heat shrinkage factor, a combination of (1), (2) and (3) is preferred, i.e. the covering layer is formed in an inclined manner so as to be thicker toward the protruding polymer particles, the contact ratio between the polymer particles protruding from the covering layer and the substrate surface in the covering layer is 20% or greater, and the 180° peel strength is 200 gf/cm or greater.

Number of Polymer Particles within 10 μm Radius

In the separator for a power storage device of the embodiment, the number of other protruding polymer particles present within a radius of 10 μm from any one protruding polymer particle is preferably less than 60, more preferably less than 40, even more preferably less than 15 and yet more preferably less than 5. This will help to reduce variation in adhesive force. The lower limit for the number of polymer particles within a radius of 10 μm is not particularly restricted and may be zero, but it may be 1 or more in order to obtain suitable density of the polymer particles and to increase the adhesive force.

Methylene Chloride-Soluble Portion

The separator for a power storage device of the embodiment has a methylene chloride-soluble portion of preferably 0.05 parts by weight to 0.80 parts by weight, more preferably 0.10 parts by weight to 0.60 parts by weight and even more preferably 0.15 parts by weight to 0.50 parts by weight, based on the total weight of the separator for a power storage device. The methylene chloride "soluble portion" is the component that is extracted into methylene chloride when the separator is immersed in methylene chloride. The plasticizer that is mixed in during production of the substrate is the major component extracted as the methylene chloride-soluble portion. If the amount of methylene chloride-soluble portion is 0.10 parts by weight or greater, binding force between the substrate and covering layer will be further increased, helping to adjust the 180° peel strength to 200 gf/cm or greater. If the methylene chloride-soluble portion is 0.60 parts by weight or lower, it will be possible to lower the battery internal resistance. The method of adjusting the methylene chloride-soluble portion to 0.05 parts by weight to 0.80 parts by weight may be, for a batch process, adjustment of the extraction time, extraction solvent type, extraction solvent temperature or number of extractions, or for a continuous process, adjustment of the extraction time, extraction solvent type, extraction solvent temperature, or extraction solvent feed rate, in the plasticizer extraction step during production of the substrate.

Metal Cation

The Total Amount of Metal Cations in the Covering Layer in the Separator for a Power Storage device of the embodiment is preferably 0.1 ppm to 100 ppm, more preferably 0.1 ppm to 70 ppm and even more preferably 0.1 ppm to 50 ppm, based on the total weight of the covering layer.

Adjusting the total amount of metal cations downward will facilitate uniform dispersion and coating of the inorganic filler and polymer particles during formation of the covering layer. The metal cation may be sodium ion ($Na^+$), calcium ion ($Ca^{2+}$) or magnesium ion ($Mg^{2+}$), for example. The method for adjusting the total amount of metal cations to 0.1 ppm to 100 ppm may be a method of washing the filler as the starting material for the covering layer before it is used. The number of washings may be once or more than once, but a greater number of washings will reduce the total amount of metal cations in the filler.

Heat Shrinkage Factor

The separator for a power storage device of the embodiment preferably has a heat shrinkage factor of 5% or lower, more preferably 0% to 3% and even more preferably 0% to 1%, in the TD direction at 130° C. for 1 hour. More preferably, the heat shrinkage factor is 5% or lower, more preferably 0% to 3% and even more preferably 0% to 1%, in the TD direction at 150° C. for 1 hour. If the heat shrinkage factor in the TD direction is 5% or lower, it will be possible to more effectively inhibit short circuiting at locations other than those where external force has been applied during heat release by short circuiting during impact testing. This will help to more reliably prevent temperature increase of the battery as a whole, and fuming or ignition that can occur as a result. Adjustment of the heat shrinkage factor of the separator can be accomplished by appropriate combination of stretching and heat treatment of the substrate. The heat shrinkage in the MD direction is also preferably 5% or lower, simultaneously with reduction of the heat shrinkage factor in the TD direction. The heat shrinkage in the MD direction is more preferably 0% to 3% and even more preferably 0% to 1%.

Separator Air Permeability

The air permeability of the separator for a power storage device is preferably 10 sec/100 $cm^3$ to 10,000 sec/100 $cm^3$, more preferably 10 sec/100 $cm^3$ to 1000 sec/100 $cm^3$, even more preferably 50 sec/100 $cm^3$ to 500 sec/100 $cm^3$ and most preferably 80 sec/100 $cm^3$ to 250 sec/100 $cm^3$. This will allow high ion permeability to be obtained. The air permeability is the air permeability resistance measured according to JIS P-8117.

Substrate (Substrate Material)

The separator for a power storage device of the embodiment has a substrate which is a polyolefin microporous membrane including a polyolefin as a main component. The phrase "including . . . as a main component" means that the component (polyolefin) is present at more than 50 parts by weight with respect to the reference weight (total weight of the substrate). The amount of polyolefin in the polyolefin microporous membrane is preferably 75 parts by weight or greater, more preferably 85 parts by weight or greater, even more preferably 90 parts by weight or greater, yet more preferably 95 parts by weight or greater and most preferably 98 parts by weight or greater, and it may even be 100 parts by weight. A polyolefin has excellent coatability as a coating solution when coated onto a film and is advantageous for obtaining reduced separator thickness, while it can increase the proportion of active material in the power storage device and increase the capacity per volume. The polyolefin microporous membrane used may be any porous membrane that has been used as a substrate for conventional separators, and preferably it has ionic conductivity without electron conductivity, while also having high resistance to organic solvents and a fine pore diameter.

The polyolefin is not particularly restricted and may be a common polyolefin used for extrusion, injection, inflation or blow molding. Examples of polyolefins include homopolymers where the monomer is ethylene, propylene, 1-butene, 4-methyl-1-pentene, 1-hexene or 1-octene, as well as copolymers or multistage polymers of two or more of these monomers. Such homopolymers, copolymers and multistage polymers may be used alone or in combinations of two or more.

Typical examples of polyolefins include polyethylene, polypropylene and polybutene, and more specifically low-density polyethylene, linear low-density polyethylene, medium-density polyethylene, high-density polyethylene, ultrahigh molecular weight polyethylene, isotactic polypropylene, atactic polypropylene, ethylene-propylene random copolymer, polybutene and ethylene-propylene rubber. They may be used alone or optionally as combinations of two or more types. From the viewpoint of the shutdown property which represents the degree to which the pores become occluded by heat-fusion, the polyolefin is preferably at least one selected from the group consisting of low-density polyethylene, linear low-density polyethylene, medium-density polyethylene, high-density polyethylene and ultrahigh molecular weight polyethylene. High-density polyethylene is particularly preferred for its low melting point and high strength, and polyethylene having a density of 0.93 g/$cm^3$ or greater as measured according to JIS K 7112 is more preferred. The polymerization catalyst used for production of the polyethylene is not particularly restricted, and examples include Ziegler-Natta catalysts, Phillips catalysts and metallocene-based catalysts. The main component of the polyolefin is preferably polyethylene, and more preferably the amount ratio of polyethylene is 50 parts by weight or greater with respect to the total weight of polyolefin in the substrate.

For improved heat resistance of the substrate, it is more preferred to use a polyolefin microporous membrane comprising polypropylene and a polyolefin other than polypropylene. Examples of polyolefin resins other than polypropylene include homopolymers where the monomer is ethylene, 1-butene, 4-methyl-1-pentene, 1-hexene or 1-octene, as well as copolymers or multistage polymers of two or more of these monomers.

The amount of polypropylene (polypropylene/polyolefin) with respect to the total weight of polyolefins in the substrate is not particularly restricted, but from the viewpoint of both heat resistance and a satisfactory shutdown function, it is preferably 1 part by weight to 35 parts by weight, more preferably 3 parts by weight to 20 parts by weight and even more preferably 4 parts by weight to 10 parts by weight. From the same viewpoint, the amount ratio of olefin resins other than polypropylene, such as polyethylene, with respect to the total weight of polyolefins in the polyolefin microporous membrane (olefin resins other than polypropylene/polyolefin) is preferably 65 parts by weight to 99 parts by weight, more preferably 80 parts by weight to 97 parts by weight and even more preferably 90 parts by weight to 96 parts by weight.

The viscosity-average molecular weight of the polyolefin as the main component of the substrate is not particularly restricted, but is preferably 30,000 to 12,000,000, more preferably 50,000 or greater and less than 2,000,000, and even more preferably 100,000 or greater and less than 1,000,000. If the viscosity-average molecular weight is 30,000 or greater, the melt tension during melt molding will increase, resulting in more satisfactory moldability, while the strength will also tend to be high due to entanglement between the polymers. If the viscosity-average molecular weight is 12,000,000 or lower, on the other hand, it will be easier to accomplish uniform melt kneading, and the sheet moldability, and especially thickness stability, will tend to be superior. The viscosity-average molecular weight is also preferably lower than 1,000,000 because the pores will be easily occluded during temperature increase, and a more satisfactory shutdown function will tend to be obtained. The viscosity-average molecular weight (Mv) is calculated based on ASTM-D4020 from the following formula, using decalin as the solvent, the limiting viscosity [η] being measured at 135° C.

$$\text{Polyethylene: } [\eta]=6.77\times10^{-4}Mv^{0.67} \quad \text{(Chiang formula)}$$

$$\text{Polypropylene: } [\eta]=1.10\times10^{-4}Mv^{0.80}$$

For example, instead of using only a polyolefin with a viscosity-average molecular weight of lower than 1,000,000, a mixture of a polyolefin with a viscosity-average molecular weight of 2,000,000 and a polyolefin with a viscosity-average molecular weight of 270,000 may be used, in such a proportion that the viscosity-average molecular weight of the mixture is lower than 1,000,000.

The substrate may also comprise resins other than polyolefins, such as polyethylene terephthalate, polycycloolefins, polyethersulfones, polyamides, polyimides, polyimideamides, polyaramids, polycycloolefins, nylons or polytetrafluoroethylene.

The substrate may also comprise optional additives. Such additives are not particularly restricted, and examples include plasticizers, polymers other than polyolefins; inorganic particles; phenol-based, phosphorus-based and sulfurbased antioxidants; metal soaps such as calcium stearate and zinc stearate; ultraviolet absorbers; light stabilizers; antistatic agents; anti-fogging agents; and color pigments. The total amount of additives is no greater than 20 parts by weight, more preferably no greater than 10 parts by weight and even more preferably no greater than 5 parts by weight, with respect to 100 parts by weight of the polyolefin resin in the polyolefin microporous membrane.

The substrate preferably includes a plasticizer. If the substrate includes a plasticizer, binding force between the substrate and covering layer will be increased, and it will be easier to control the 180° peel strength to 200 gf/cm or greater. The amount of the plasticizer is preferably 0.1 parts by weight to 1.6 parts by weight, more preferably 0.2 parts by weight to 1.2 parts by weight, or 0.3 parts by weight to 1.0 parts by weight, based on the total weight of the substrate. If the plasticizer amount is within this range, battery internal resistance can be lowered while increasing the binding force between the substrate and covering layer. Examples of plasticizers include hydrocarbons such as liquid paraffin; esters such as dioctyl phthalate and dibutyl phthalate; and higher alcohols such as oleyl alcohol and stearyl alcohol. The plasticizer is preferably liquid paraffin.

(Substrate Structure)

The porosity of the substrate is not particularly restricted but is preferably 30% to 60% and more preferably 35% to 50%. This will allow suitable impregnation of the covering layer into the micropores of the substrate and further facilitate control of the 180° peel strength to 200 gf/cm or greater. The porosity can be calculated by the following formula:

Porosity=(Volume−weight/film density)/volume×100, based on the volume ($cm^3$), weight (g) and film density ($g/cm^3$) of a measuring sample of the substrate. When the polyolefin microporous membrane is composed of polyethylene, for example, calculation may be performed assuming a film density of 0.95 $g/cm^3$. The porosity can be adjusted by changing the stretch ratio of the polyolefin microporous membrane.

The air permeability of the substrate is not particularly restricted but is preferably 10 sec/100 $cm^3$ to 10,000 sec/100 $cm^3$, more preferably 10 sec/100 $cm^3$ to 1000 sec/100 $cm^3$, even more preferably 40 sec/100 $cm^3$ to 450 sec/100 $cm^3$ and most preferably 70 sec/100 $cm^3$ to 200 sec/100 $cm^3$. This will allow suitable impregnation of the covering layer into the micropores of the substrate and further facilitate control of the 180° peel strength to 200 gf/cm or greater. The air permeability is the air permeability resistance measured according to JIS P-8117. The air permeability can be adjusted by changing the stretching temperature and/or stretch ratio of the substrate.

The mean pore size of the substrate is preferably 0.15 μm or lower and more preferably 0.1 μm or lower, and also preferably 0.01 μm or greater. A mean pore size of 0.15 μm or lower is preferred from the viewpoint of minimizing self-discharge of the power storage device and helping to prevent reduction in capacity. The mean pore size can be adjusted by changing the stretch ratio during production of the substrate.

The puncture strength of the substrate is not particularly restricted, but is preferably 200 gf/20 μm or greater, more preferably 300 gf/20 μm or greater and even more preferably 400 gf/20 μm or greater, and also preferably 2000 gf/20 μm or lower and more preferably 1000 gf/20 μm or lower. The puncture strength is preferably 200 gf/20 μm or greater from the viewpoint of minimizing film rupture when the active material is shed during winding of the separator with the electrodes, and from the viewpoint of concerns regarding short circuiting by expansion and contraction of the electrodes that occurs with charge-discharge. On the other hand, the puncture strength is preferably 2000 gf/20 μm or lower from the viewpoint of reducing width shrinkage caused by relaxation of orientation during heating. The puncture strength is measured by the method described in the Examples. The puncture strength can be adjusted by setting the stretch ratio and/or stretching temperature of the substrate.

The thickness of the substrate is not particularly restricted, but is preferably 2 μm or greater, more preferably 5 μm or greater, even more preferably 6 μm or greater and most preferably 7 μm or greater, and preferably 100 μm or smaller, more preferably 60 μm or smaller, even more preferably 50 μm or smaller and most preferably 16 μm or smaller. The film thickness is preferably 2 μm or greater from the viewpoint of increasing the mechanical strength. The film thickness is also 100 μm or smaller because this will reduce the volume of the power storage device occupied by the separator, which is advantageous for increasing the capacity of the power storage device.

Covering Layer

The separator for a power storage device of the embodiment also comprises a covering layer disposed on at least one surface of the substrate. Specifically, the covering layer may disposed only on one side of the substrate, or it may be disposed on both sides. Here, "disposed on the surface" means either disposed over the entire surface of the substrate, or disposed on only a portion thereof. The covering layer is intended to be directly bonded to an electrode. Preferably, the covering layer is disposed so as to be directly bonded to the electrode, with the substrate and electrode bonded through the covering layer. The covering layer is preferably a coating layer formed by a method of coating the substrate with a coating solution comprising the inorganic filler and polymer particles.

The covering layer comprises the inorganic filler, polymer particles composed of a thermoplastic polymer, and a resin binder. The covering layer may also comprise a water-soluble polymer and other additives in addition to the polymer particles composed of a thermoplastic polymer.

(Inorganic Filler)

The inorganic filler is not particularly restricted, but preferably it has a melting point of 200° C. or higher and also high electrical insulating properties, and is also electrochemically stable in the range in which a power storage device such as a lithium ion secondary battery is to be used. Examples of such inorganic fillers include inorganic oxides (oxide-based ceramics) such as alumina, silica, titania, zirconia, magnesia, ceria, yttria, zinc oxide and iron oxide; inorganic nitrides (nitride-based ceramics) such as silicon nitride, titanium nitride and boron nitride; ceramics such as silicon carbide, calcium carbonate, magnesium sulfate, aluminum sulfate, barium sulfate, aluminum hydroxide, aluminum oxide hydroxide, potassium titanate, talc, kaolinite, dickite, nacrite, halloysite, pyrophyllite, montmorillonite, sericite, mica, amesite, bentonite, asbestos, zeolite, calcium silicate, magnesium silicate, diatomaceous earth and quartz sand; and glass fibers. They may be used alone or as combinations of two or more types. The inorganic filler is preferably at least one selected from the group consisting of alumina, barium sulfate and aluminum oxide hydroxide (boehmite).

The lower limit for the mean particle size of the inorganic filler is preferably 50 nm or greater, 100 nm or greater, 150 nm or greater, 200 nm or greater, 250 nm or greater, 300 nm or greater, 350 nm or greater or 400 nm or greater, and the upper limit is preferably 2000 nm or lower, 1100 nm or lower, 800 nm or lower, 450 nm or lower, 400 nm or lower, 350 nm or lower or 300 nm or lower. A mean particle size of 50 nm or greater for the inorganic filler is preferred from the viewpoint of preserving voids for ion permeation through the covering layer and increasing the rate characteristic. A mean particle size of 2000 nm or lower for the inorganic filler is preferred from the viewpoint of increasing the fill rate of the inorganic filler in the covering layer and improving the heat shrinkage resistance. The mean particle size of the inorganic filler is preferably 180 nm to 300 nm, for example. This is in order to form a homogeneous covering layer in cases of especially small thickness of the covering layer, and to improve the heat shrinkage resistance. The mean particle size of the inorganic filler is also preferably 250 nm to 450 nm, for example. This will help achieve high levels for both the rate characteristic and heat shrinkage resistance. The "mean particle size" of the inorganic filler was measured by the method described in the Examples. The method of adjusting the particle sizes of the inorganic filler and their distribution may be, for example, a method of pulverizing the inorganic filler using a suitable pulverizing apparatus such as a ball mill, bead mill or jet mill to reduce their particle sizes. The particle size distribution of the inorganic filler may have a single peak in a graph of frequency plotted against particle size. However, the graph may also have two peaks, or may be a trapezoid chart without peaks.

Examples for the form of the inorganic filler include laminar, scaly, needle-like, columnar, spherical, polyhedral and globular (block-like). Different types of inorganic fillers with such shapes may also be combined. Block shapes are preferred from the viewpoint of improving the slope of the covering layer and increasing the adhesive force with electrodes.

The aspect ratio of the inorganic filler is preferably 1.0 to 2.5 and more preferably 1.1 to 2.0. The aspect ratio is preferably 2.5 or lower from the viewpoint of inhibiting moisture adsorption on the multilayer porous membrane and preventing capacity deterioration with repeated cycling, and also from the viewpoint of inhibiting deformation at temperatures above the melting point of the PO substrate, improving the slope of the covering layer and increasing the adhesive force with electrodes. The reason for increased slope when the aspect ratio of the inorganic filler is 1.0 to 2.5 is thought to be that the particles are less oriented in the covering layer, tending to result in formation of a layered structure.

The particle size distribution of the inorganic filler, determined by dividing the standard deviation SD for the volume-average particle size of the inorganic filler by the D50 value, is preferably 0.55 or lower, more preferably 0.50 or lower and even more preferably 0.45 or lower. The particle size distribution is preferably 0.55 or lower from the viewpoint of inhibiting deformation at temperatures above the melting point of the PO substrate, improving the slope of the covering layer and increasing the adhesive force with electrodes. The reason for increased slope when the particle size distribution of the inorganic filler is 0.55 or lower is thought to be that uniformity of the particles increases, thereby increasing the contact ratio between particles, and tending to result in formation of a layered structure.

The amount of the inorganic filler may be 20 parts by weight or greater and less than 100 parts by weight, 30 parts by weight to 80 parts by weight, 35 parts by weight to 70 parts by weight, or 40 parts by weight to 60 parts by weight, for example, with respect to the total weight of the covering layer.

(Polymer Particles)

The polymer particles are particles of a thermoplastic polymer. From the viewpoint of increasing adhesion between the separator and electrodes, the polymer particles preferably comprise a thermoplastic polymer with a glass transition temperature or melting point of 20° C. to 200° C. The glass transition temperature is the midpoint glass transition temperature according to JISK7121, determined from a DSC curve obtained by differential scanning calorimetry (DSC). Specifically, the value used for the glass transition temperature may be the temperature at the intersection between a straight line extending the low-temperature end baseline in the DSC curve toward the high-temperature end, and the curve at the portion of glass transition that changes in a stepwise manner with respect to a straight line equidistant in the vertical axis direction from a straight line extending the high-temperature end baseline in the DSC curve toward the low-temperature end. More specifically, it may be determined by the method described in the Examples. Moreover, the "glass transition" refers to the value when a change in heat flow rate accompanying the change in state of a polymer test piece in DSC occurs at the endothermic end. The change in heat flow rate is observed in the form of a stepwise change in the DSC curve. A "stepwise change" is a portion of the DSC curve moving away from the previous low-temperature end baseline and toward a new high-temperature end baseline. A combination of a stepwise change and a peak is also included in the concept of "stepwise change". If the exothermic end in the stepwise change region is defined as the top end, then this represents the point where the upwardly convex curve changes to a downwardly convex curve. The term "peak" refers to a portion of the DSC curve that moves away from the low-temperature end baseline and then returns to the same baseline. The term "baseline" refers to the DSC curve in the temperature zone where no transition or reaction takes place in the test piece.

The glass transition temperature (Tg) for the polymer particles is preferably 20° C. to 110° C., more preferably 50° C. or higher, even more preferably 80° C. or higher and yet more preferably 90° C. or higher, with 90° C. or higher being especially preferred from the viewpoint of improving adhesive force after injection of the electrolyte solution. A Tg of 20° C. or higher for the polymer particles is preferred from the viewpoint of storage and transport of the separator for a power storage device, and of inhibiting blocking of the adjacent separator through the covering layer during the production process for the power storage device. The Tg of the polymer particles is preferably 110° C. or lower from the viewpoint of obtaining satisfactory adhesive force with electrodes. The Tg of the polymer particles can be appropriately adjusted by changing the type of monomer used for production of the polymer particles, and the mixing ratio of each monomer, when the polymer particles consist of a copolymer. Specifically, the glass transition temperature for each monomer used for production of the polymer particles can be estimated from the commonly used Tg for its homopolymer (as listed in "Polymer Handbook" (a Wiley-Interscience Publication), for example), and the mixing proportion of the monomer. For example, the Tg of a copolymer copolymerized with a high proportion of a monomer such as methyl methacrylate, acrylonitrile or methacrylic acid, all of which have homopolymer Tg values of ~100° C., will be higher, and the Tg of a copolymer copolymerized with a high proportion of a monomer such as n-butyl acrylate or 2-ethylhexyl acrylate, both of which have homopolymer Tg values of ~−50° C., will be lower. The Tg of the copolymer can also be estimated by the Fox method represented by the following mathematical formula (1).

$$1/Tg=W_1/Tg_1+W_2/Tg_2+\ldots+W_i/Tg_i+\ldots W_n/Tg_n \quad (1)$$

In this formula, Tg (K) is the Tg of the copolymer, $Tg_i$ (K) is the Tg of the homopolymer of monomer i, and $W_i$ is the mass fraction of each monomer. However, the glass transition temperature Tg of the polymer particles used for this embodiment is the value measured by a method using DSC as described above.

From the viewpoint of adhesion between the separator and electrodes and preventing the polymer particles from being shed from the covering layer, the mean particle size of the polymer particles is preferably at least 0.5 times and not more than 5 times, more preferably at least equal to and not more than 2 times, even more preferably at least 1.1 times and less than 1.5 times, and most preferably at least 1.2 times and not more than 1.4 times, the thickness of the covering layer. The "mean particle size" of the polymer particles is the volume-average particle size measured by the measuring method described in the Examples. The "primary particles" among the polymer particles are independent particles that are integrated by covalent bonds. The term "secondary particles" refers to particles formed by aggregation of two or more primary particles.

The particle size distribution MV/MN of the polymer particles, as determined by dividing the volume-average particle size MV of the polymer particles by the number-mean particle size MN, is preferably 1.60 or lower, more preferably 1.30 or lower, even more preferably 1.20 or lower, yet more preferably 1.10 or lower and most preferably lower than 1.10. The particle size distribution of the polymer particles is preferably within this range from the viewpoint of ensuring uniformity of the covering layer thickness, improving the cycle characteristic and increasing adhesive force with electrodes, from the viewpoint of reducing the amount of polymer particles at the small particle size end of the distribution which are embedded within the covering layer, increasing the adhesive force with electrodes and improving the heat resistance, and from the viewpoint of reducing the total thickness of the separator. The lower limit for the particle size distribution MV/MN of the polymer particles is not particularly restricted but may be 1.01 or greater, or it may be 1.01.

The polymer particles in the covering layer are preferably in the form of primary particles. The mean particle size of the primary particles of the polymer particles is preferably 1 μm to 10 μm, more preferably 1 μm to 5 μm and even more preferably 2 μm to 4 μm. That the polymer particles are in the form of primary particles means that the polymer particles are uniformly dispersed throughout the covering layer, thus improving the 180° peel strength, increasing the adhesive force with electrodes, inhibiting heat shrinkage and ensuring uniformity for the covering layer thickness. If the mean particle size of the primary particles is 1 μm to 10 μm, then the polymer particles will tend to form a structure that protrudes from the surface of the covering layer, resulting in higher adhesive force with electrodes and inhibited heat shrinkage.

Thermoplastic polymers include (meth)acrylic polymers, conjugated diene-based polymers, polyvinyl alcohol-based resins and fluorine-containing resins.

From the viewpoint of high adhesion with electrodes and a low heat shrinkage factor, the thermoplastic polymer more preferably comprises a (meth)acrylic polymer. A "(meth) acrylic polymer" is a polymer (or copolymer) comprising at least one (meth)acrylic compound selected from the group consisting of acrylic acid, methacrylic acid, acrylic acid esters and methacrylic acid esters, as a monomer. Such (meth)acrylic compounds can be represented by the following general formula.

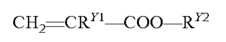

$CH_2{=}CR^{Y1}{-}COO{-}R^{Y2}$

In the formula, $R^{Y1}$ represents a hydrogen atom or a methyl group, and $R^{Y2}$ represents a hydrogen atom or a monovalent hydrocarbon group. When $R^{Y2}$ is a monovalent hydrocarbon group, it may be substituted, or it may have a heteroatom. Examples of monovalent hydrocarbon groups include linear or branched chain alkyl, cycloalkyl and aryl groups. Examples of substituents include hydroxyl and phenyl groups and examples of heteroatoms include halogen and oxygen atoms. A single (meth)acrylic compound may be used alone, or two or more may be used in combination. Such (meth)acrylic compounds include (meth)acrylic acid, linear alkyl (meth)acrylates, cycloalkyl (meth)acrylates, (meth)acrylates with hydroxyl groups, and aryl (meth)acrylate esters.

More specifically, linear alkyl (meth)acrylates include (meth)acrylates comprising linear alkyl groups of 1 to 3 carbon atoms such as methyl, ethyl, n-propyl and isopropyl groups; and linear alkyl groups of 4 or more carbon atoms, such as n-butyl, isobutyl, t-butyl, n-hexyl and 2-ethylhexyl groups, and lauryl groups. Phenyl (meth)acrylate is an example of an aryl (meth)acrylate ester.

Specific examples of (meth)acrylates include (meth)acrylates with linear alkyl groups such as methyl acrylate, ethyl acrylate, propyl acrylate, isopropyl acrylate, butyl acrylate, isobutyl acrylate, t-butyl acrylate, n-hexyl acrylate, 2-ethylhexyl acrylate, lauryl acrylate, methyl methacrylate, ethyl methacrylate, propyl methacrylate, isopropyl methacrylate, butyl methacrylate, isobutyl methacrylate, t-butyl methacrylate, n-hexyl methacrylate, 2-ethylhexyl methacrylate and lauryl methacrylate; and (meth)acrylates with aromatic rings such as phenyl (meth)acrylate and benzyl (meth)acrylate.

A conjugated diene-based polymer is a polymer with a conjugated diene compound as the monomer unit, and it is preferred for compatibility with electrodes. Examples of conjugated diene compounds include 1,3-butadiene, 2-methyl-1,3-butadiene, 2,3-dimethyl-1,3-butadiene, 2-chlor-1,3-butadiene, substituted linear conjugated pentadienes and substituted or side chain-conjugated hexadienes, any of which may be used alone or in combinations of two or more. A particularly preferred example is 1,3-butadiene. The conjugated diene-based polymer may also include a (meth)acrylic compound or another monomer as a monomer unit. Examples of such monomers include styrene-butadiene copolymer and its hydrogenated forms, acrylonitrile-butadiene copolymer and its hydrogenated forms, and acrylonitrile-butadiene-styrene copolymer and its hydrogenated forms.

Examples of polyvinyl alcohol-based resins include polyvinyl alcohol and polyvinyl acetate.

A fluorine-containing resin is preferred from the viewpoint of voltage endurance, with examples including polyvinylidene fluoride, polytetrafluoroethylene and fluorine atom-containing copolymers, such as vinylidene fluoride-hexafluoropropylene copolymer, vinylidene fluoride-hexafluoropropylene-tetrafluoroethylene copolymer and ethylene-tetrafluoroethylene copolymer. The fluorine-containing resin is preferably a fluorine atom-containing copolymer.

Of the thermoplastic polymers mentioned above, the polymer particles preferably include at least one copolymer selected from the group consisting of copolymers containing (meth)acrylate as a monomer, styrene-butadiene copolymer, and fluorine atom-containing copolymers. A copolymer containing (meth)acrylate as a monomer preferably includes a copolymer containing (meth)acrylic acid, butyl (meth)acrylate or ethylhexyl (meth)acrylate as a monomer. If the polymer particles include these specific thermoplastic polymers, it will be possible to provide a separator for a power storage device having higher adhesive force with electrodes, and a lower heat shrinkage factor.

The polymer particles preferably comprise a crosslinkable monomer. There are no particular restrictions on the crosslinkable monomer, and examples include monomers with two or more radical-polymerizing double bonds, and monomers with a functional group that provides a self-crosslinking structure either during or after polymerization. They may be used alone or optionally as combinations of two or more types.

Examples of monomers with two or more radical-polymerizing double bonds include divinylbenzene and polyfunctional (meth)acrylates, with polyfunctional (meth)acrylates being preferred. A polyfunctional (meth)acrylate may be one or more types selected from the group consisting of bifunctional (meth)acrylates, trifunctional (meth)acrylates and tetrafunctional (meth)acrylates. Specific examples include polyoxyethylene diacrylate, polyoxyethylene dimethacrylate, polyoxypropylene diacrylate, polyoxypropylene dimethacrylate, neopentyl glycol diacrylate, neopentyl glycol dimethacrylate, butanediol diacrylate, butanediol dimethacrylate, trimethylolpropane triacrylate, trimethylolpropane trimethacrylate, pentaerythritol tetraacrylate and pentaerythritol tetramethacrylate. They may be used alone or optionally as combinations of two or more types. From the same viewpoint as above, trimethylolpropane triacrylate and/or trimethylolpropane trimethacrylate is preferred.

(Resin Binder)

The covering layer preferably comprises a resin binder for bonding within the inorganic filler and between the inorganic filler and substrate. The type of resin of the resin binder is not particularly restricted, and it may be a resin that is insoluble in the electrolyte solution of a power storage device such as a lithium ion secondary battery and electrochemically stable in the operating range of a power storage device such as a lithium ion secondary battery.

Specific examples of resins for resin binders include resins with a melting point of 180° C. or higher, or resins without a melting point but having a decomposition temperature of 200° C. or higher, among which are polyolefins such as polyethylene and polypropylene; fluorinated resins such as polyvinylidene fluoride and polytetrafluoroethylene; fluorinated rubbers such as vinylidene fluoride-hexafluoropropylene-tetrafluoroethylene copolymer and ethylene-tetrafluoroethylene copolymer; rubbers such as styrene-butadiene copolymer and its hydrogenated forms, acrylonitrile-butadiene copolymer and its hydrogenated forms, acrylonitrile-butadiene-styrene copolymer and its hydrogenated forms, methacrylic acid ester-acrylic acid ester copolymer, styrene-acrylic acid ester copolymer, acrylonitrile-acrylic acid ester copolymer, ethylene-propylene rubber, polyvinyl alcohol and polyvinyl acetate; cellulose derivatives such as ethyl cellulose, methyl cellulose, hydroxyethyl cellulose and carboxymethyl cellulose; and polyphenylene ether, polysulfone, polyethersulfone, polyphenylene sulfide, polyetherimide, polyamideimide, polyamide, polyester and the like. They may be used alone or optionally as combinations of two or more types.

The resin binder may include a resin latex binder, for example. Examples of resin latex binders include copolymers of unsaturated carboxylic acid monomers, and other monomers that are copolymerizable with them. Examples of aliphatic conjugated diene-based monomers include butadiene and isoprene, with unsaturated carboxylic acid monomers including (meth)acrylic acid, and other monomers including styrene. The polymerization method for such a copolymer is not particularly restricted but is preferably emulsion polymerization. There are no particular restrictions on the method of emulsion polymerization, and any known method may be employed. The method of adding the monomers and other components is also not particularly restricted and may be a batch addition method, multistage addition method or continuous addition method, and the polymerization method used may be single-stage polymerization, or multistage polymerization such as two-stage polymerization or three-stage polymerization, or with more stages.

Specific examples of resin binders include the following 1) to 7).

1) Polyolefins such as polyethylene, polypropylene, ethylene-propylene rubber and their modified forms;
2) Conjugated diene-based polymers such as styrene-butadiene copolymers and their hydrogenated forms, acrylonitrile-butadiene copolymers and their hydrogenated forms and acrylonitrile-butadiene-styrene copolymers and their hydrogenated forms;
3) Acrylic polymers such as methacrylic acid ester-acrylic acid ester copolymers, styrene-acrylic acid ester copolymers and acrylonitrile-acrylic acid ester copolymers;
4) Polyvinyl alcohol-based resins such as polyvinyl alcohol and polyvinyl acetate; 5) Fluorine-containing resins such as polyvinylidene fluoride, polytetrafluoroethylene, vinylidene fluoride-hexafluoropropylene-tetrafluoroethylene copolymer and ethylene-tetrafluoroethylene copolymer;
6) Cellulose derivatives such as ethyl cellulose, methyl cellulose, hydroxyethyl cellulose and carboxymethyl cellulose; and
7) Polymers that are resins with a melting point and/or glass transition temperature of 180° C. or higher, or without a melting point but having a decomposition temperature of 200° C. or higher: such as polyphenylene ethers, polysulfones, polyethersulfones, polyphenylene sulfides, polyetherimides, polyamideimides, polyamides and polyesters.

When the resin binder is a resin latex binder, the volume-average particle size (D50) is 50 nm to 500 nm, 60 nm to 460 nm or 80 nm to 250 nm, for example. The volume-average particle size of the resin binder can be controlled, for example, by adjusting the polymerization time, the polymerization temperature, the compositional ratio of the components, the loading order of the components, and the pH.

The resin binder preferably has a glass transition temperature of 25° C. or lower, more preferably 10° C. or lower and even more preferably −15° C. or lower, from the viewpoint of increasing the 180° peel strength. It is also preferably −60° C. or higher from the viewpoint of permeability.

From the viewpoint of improving the 180° peel strength, the volume-average particle size (D50) of the resin binder is preferably at least equal to, more preferably at least 2 times and more preferably at least 2.5 times the mean pore size of the polyolefin microporous membrane. By selecting the volume-average particle size (D50) of the resin binder in this manner it is possible to retain the resin binder on the surface of the polyolefin microporous membrane and improve the 1800 peel strength. The volume-average particle size (D50) of the resin binder is preferably not more than 10 times the mean pore size of the polyolefin microporous membrane from the viewpoint of improving the rate characteristic. The amount ratio of the resin binder in the covering layer may be greater than 0 parts by weight and 80 parts by weight or lower, or 1 part by weight to 20 parts by weight, 2 parts by weight to 10 parts by weight or 3 parts by weight to 5 parts by weight, for example, with respect to the total amount of the covering layer.

The Tg of the resin binder is preferably lower than 40° C. from the viewpoint of wettability onto the substrate, bondability between the substrate and the polymer particles, bondability between the covering layer and the polymer particles, bondability between the substrate and the covering layer, and adhesion with electrodes. From the viewpoint of ion permeability, the Tg of the resin binder is more preferably −100° C. or higher, even more preferably −50° C. or higher and most preferably −40° C. or higher, while from the viewpoint of bondability between the substrate and the polymer particles it is more preferably lower than 20° C., even more preferably lower than 15° C. and most preferably lower than 0° C.

(Water-Soluble Polymer)

The covering layer may further include a water-soluble polymer in addition to the inorganic filler and polymer particles. The water-soluble polymer may be non-compatible with the thermoplastic polymer of the polymer particles. A water-soluble polymer will generally function as a dispersing agent in the coating solution for formation of the covering layer comprising an inorganic filler and polymer particles composed of a thermoplastic polymer, and will function as a dispersing agent and/or humectant when the coating solution is an aqueous coating material.

The amount of water-soluble polymer in the covering layer is preferably 0.04 parts by weight or greater and less than 2 parts by weight, more preferably 0.04 parts by weight to 1.5 parts by weight and even more preferably 0.1 parts by weight to 1 part by weight, with respect to 100 parts by weight of the inorganic filler. If the amount of water-soluble polymer is 0.04 parts by weight or greater, it will be possible to increase bondability between the inorganic components and further inhibit heat shrinkage. Such a range will also reduce precipitation of the components during preparation of the slurry for the covering layer, helping to facilitate their stable dispersion. If the amount of water-soluble polymer is 5 parts by weight or lower it will be possible to inhibit streaks and irregularities during formation of the covering layer.

The water-soluble polymer also contributes to bondability within the inorganic filler in the covering layer. From the viewpoint of inhibiting heat shrinkage of the separator, the water-soluble polymer preferably has a weight reduction of less than 10% at 150° C., where the weight at 50° C. in thermogravimetry is defined as 100%.

The water-soluble polymer may be a naturally derived polymer, or a synthetic product or semisynthetic product, but from the viewpoint of forming a coating material, and especially an aqueous coating material, from the inorganic components and organic components, it is preferably an anionic, cationic, amphoteric or nonionic polymer, and more preferably an anionic, cationic or amphoteric polymer.

Examples of anionic polymers include starch modified polymers such as carboxymethyl starch and starch phosphate; anionic cellulose derivatives such as carboxymethyl cellulose; ammonium salts or alkali metal salts of polyacrylic acid; gum arabic; carrageenan; sodium chondroitin sulfate; sulfonic acid-based compounds such as sodium polystyrenesulfonate, sodium polyisobutylenesulfonate and naphthalenesulfonic acid condensation salts; and polyethyleneimine xanthate. From the viewpoint of achieving a suitable balance between rigidity, rate characteristic and cycle characteristic for a power storage device and it is preferred to use an anionic polymer with a metal salt as the counter cation; it is more preferred to use an anionic cellulose derivative and a polyacrylic acid ammonium salt or alkali metal salt; while from the viewpoint of balance between heat resistance and rate characteristic, it is preferred to use a polyacrylic acid alkali metal salt, with sodium polyacrylate being more preferred.

A polyacrylic acid ammonium salt or alkali metal salt is a polymer wherein one or more —$COO^-$ portions of multiple carboxylic acid groups form a salt with ammonium ion or alkali metal ion. Examples of alkali metal ions include sodium ion ($Na^+$) and potassium ion ($K^+$).

A polyacrylic acid ammonium salt or alkali metal salt may be one or more of the following (I) to (III).

(I) a homopolymer of monomer ($C_i$) having one carboxylic acid ammonium salt or alkali metal salt, or a copolymer of multiple monomers ($C_i$) with another monomer;

(II) a homopolymer of monomer ($C_{ii}$) having more than one carboxylic acid ammonium salt or alkali metal salt, or a copolymer of monomer ($C_{ii}$) with another monomer; and (III) an ammonium salt or alkali metal salt of a polymer or copolymer obtained by polymerization or copolymerization of one or more carboxylic acid-containing monomers.

The monomer ($C_i$) having one carboxylic acid ammonium salt or alkali metal salt may be sodium (meth)acrylate or ammonium (meth)acrylate, for example.

The monomer ($C_{ii}$) having more than one carboxylic acid ammonium salt or alkali metal salt may be an ammonium salt or sodium salt of 11-(methacryloyloxy)undecane-1,1-dicarboxylic acid; an ammonium salt, monosodium salt or disodium salt of an ethylenic unsaturated dicarboxylic acid such as fumaric acid, maleic acid, itaconic acid or citraconic acid; or an alicyclic polybasic carboxylic acid with a (meth) acryloyl group.

Examples of monomers that are copolymerizable with monomer ($C_i$) or monomer ($C_{ii}$) include (meth)acrylamide; ethylenic unsaturated dicarboxylic acids such as fumaric acid, maleic acid, itaconic acid and citraconic acid; and ethylenic unsaturated dicarboxylic acid anhydrides such as maleic anhydride, itaconic anhydride and citraconic anhydride.

The ammonium salt or alkali metal salt of a polymer or copolymer obtained by polymerization or copolymerization of a monomer having one or more carboxylic acids may be sodium polyacrylate or ammonium polyacrylate.

The structures of the ammonium salts or alkali metal salts of polyacrylic acid mentioned in (I) to (III) above may also mutually overlap.

The ammonium salt or alkali metal salt of polyacrylic acid mentioned in (I) to (III) above preferably has a low multivalent cation content when dissolved in water. Multivalent cations include magnesium ion, calcium ion and iron ion. Reducing the amount of these ions will stabilize the dispersibility of the polymer particles in the mixed slurry with the polymer particles.

Examples of cationic polymers include cationic starch; chitosan; gelatin; dimethylaminoethyl (meth)acrylate quaternary salt homopolymers and copolymers; dimethylallylammonium chloride homopolymers and copolymers; polyamidine and its copolymers; polyvinylimidazoline; dicyandiamide-based condensation products; epichlorohydrin-dimethylamine condensation products; and polyethyleneimine.

Examples of amphoteric polymers include dimethylaminoethyl (meth)acrylate quatemary salt-acrylic acid copolymers and polyacrylamide Hoffmann decomposition products.

Examples of nonionic polymers include starch and its derivatives; cellulose derivatives such as methyl cellulose, hydroxyethyl cellulose and hydroxypropyl cellulose and their ammonium salts and alkali metal salts; gums such as guar gum and their modified forms; and synthetic polymers such as polyvinyl alcohol, polyacrylamide, polyethylene glycol, polymethylvinyl ether, polyisopropyl acrylamide, vinyl alcohol, and copolymers with other monomers, and their modified forms.

The water-soluble polymer may have or may lack an amide bond-containing cyclic structure.

A water-soluble polymer having an amide bond-containing cyclic structure is a homopolymer or copolymer having a group with an amide bond-containing cyclic structure and a backbone derived from a polymerizable double bond. The water-soluble polymer with an amide bond-containing cyclic structure may also have one or more amide bond-containing cyclic structures.

Groups with amide bond-containing cyclic structures include groups represented by the following formula (2):

(2)

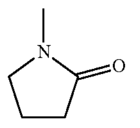

Specific examples of water-soluble polymers with amide bond-containing cyclic structures include homopolymers of monomers having a group with an amide bond-containing cyclic structure, and a polymerizable double bond, such as the N-vinylcaprolactam homopolymer poly(N-vinylcaprolactam) or the vinylpyrrolidone homopolymer polyvinylpyrrolidone (PVP); copolymers of two or more monomers having a group with an amide bond-containing cyclic structure, and a polymerizable double bond (such as N-vinylcaprolactam or vinylpyrrolidone); and copolymers of one or more monomers having a group with an amide bond-containing cyclic structure, and a polymerizable double bond (such as N-vinylcaprolactam and vinylpyrrolidone), and one or more monomers having another polymerizable double bond (monomers other than the monomer(s) having a group with an amide bond-containing cyclic structure, and a polymerizable double bond).

Monomers that are copolymerizable with monomers having a group with an amide bond-containing cyclic structure, and a polymerizable double bond, include vinyl acyclic amides; (meth)acrylic acid and its esters; (meth)acrylamide and its derivatives; styrene and its derivatives; vinyl esters such as vinyl acetate; α-olefins; basic unsaturated compounds and their derivatives such as vinylimidazole and vinylpyridine; carboxyl group-containing unsaturated compounds and their acid anhydrides; vinylsulfonic acid and its derivatives; vinylethylene carbonate and its derivatives; and vinyl ethers.

(Additives)

The covering layer may consist only of an inorganic filler, polymer particles and optionally a water-soluble polymer, or it may further comprise additives in addition to these. Examples of additives include low molecular weight dispersants other than water-soluble polymers; thickeners; antifoaming agents; and pH adjustors such as ammonium hydroxide. Specific examples of low molecular weight dispersants include monomers ($C_{ii}$) having more than one ammonium salt or alkali metal salt of a carboxylic acid, and non-polymerizable compounds having more than one ammonium salt or alkali metal salt of a carboxylic acid (such as sodium alginate and sodium hyaluronate).

As a specific example of an antifoaming agent, it is preferred to use a surfactant comprising an ethoxylated acetylene glycol (acetylene-based surfactant) represented by the following formula (A):

(A)

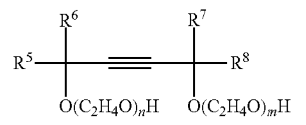

{where $R^5$ to $R^8$ each independently represent an alkyl group of 1 to 10 carbon atoms, and n and m each independently represent an integer of 0 or greater, with n+m=0 to 40}. Specific examples of alkyl groups of 1 to 10 carbon atoms include linear, branched chain and cyclic groups, such as methyl, ethyl, n-propyl, isopropyl, n-butyl, sec-butyl, tert-butyl, n-pentyl, n-hexyl, n-heptyl, n-octyl, n-nonyl and n-decyl.

Specific examples of acetylene glycol represented by formula (A) include ethoxylated forms of 2,5,8,11-tetramethyl-6-dodecyne-5,8-diol, 5,8-dimethyl-6-dodecyne-5,8-diol, 2,4,7,9-tetramethyl-5-decyne-4,7-diol, 4,7-dimethyl-5-decyne-4,7-diol, 2,3,6,7-tetramethyl-4-octyne-3,6-diol, 3,6-dimethyl-4-octyne-3,6-diol, 2,5-dimethyl-3-hexyne-2,5-diol and 2,4,7,9-tetramethyl-5-decyne-4,7-diol (ethylene oxide addition moles: 1.3), ethoxylated 2,4,7,9-tetramethyl-5-decyne-4,7-diol (ethylene oxide addition moles: 4), ethoxylated 3,6-dimethyl-4-octyne-3,6-diol (ethylene oxide addition moles: 4), ethoxylated 2,5,8,11-tetramethyl-6-dodecyne-5,8-diol (ethylene oxide addition moles: 6), ethoxylated 2,4,7,9-tetramethyl-5-decyne-4,7-diol (ethylene oxide addition moles: 10), ethoxylated 2,4,7,9-tetramethyl-5-decyne-4,7-diol (ethylene oxide addition moles: 30) and ethoxylated 3,6-dimethyl-4-octyne-3,6-diol (ethylene oxide addition moles: 20), any of which may be used alone or in combinations of two or more.

Acetylene-based surfactants are available as commercial products, examples of such commercial products including OLFINE SPC (Nisshin Chemical Industry Co., Ltd., active ingredient: 80 parts by weight, pale yellow liquid), OLFINE AF-103 (Nisshin Chemical Industry Co., Ltd., pale brown liquid), OLFINE AF-104 (Nisshin Chemical Industry Co., Ltd., pale brown liquid), OLFINE SK-14 (Nisshin Chemical Industry Co., Ltd., pale yellow viscous liquid), OLFINE AK-02 (Nisshin Chemical Industry Co., Ltd., pale yellow viscous liquid), OLFINE AF-201F (Nisshin Chemical Industry Co., Ltd., pale yellow viscous liquid), OLFINE D-10PG (Nisshin Chemical Industry Co., Ltd., active ingredient: 50 parts by weight, pale yellow liquid), OLFINE E-1004 (Nisshin Chemical Industry Co., Ltd., active ingredient: 100 parts by weight, pale yellow liquid), OLFINE E-1010 (Nisshin Chemical Industry Co., Ltd., active ingredient: 100 parts by weight, pale yellow liquid), OLFINE E-1020 (Nisshin Chemical Industry Co., Ltd., active ingredient: 100 parts by weight, pale yellow liquid), OLFINE E-1030W (Nisshin Chemical Industry Co., Ltd., active ingredient: 75 parts by weight, pale yellow liquid), SURFYNOL 420 (Nisshin Chemical Industry Co., Ltd., active ingredient: 100 parts by weight, pale yellow viscous liquid), SURFYNOL 440 (Nisshin Chemical Industry Co., Ltd., active ingredient: 100 parts by weight, pale yellow viscous liquid), and SURFYNOL 104E (Nisshin Chemical Industry Co., Ltd., active ingredient: 50 parts by weight, pale yellow viscous liquid).

A polyether-based surfactant and/or a silicone-based surfactant may also be used as a post-added surfactant, either instead of or in addition to an acetylene-based surfactant. Representative examples of polyether-based surfactants include polyethylene glycol, polypropylene glycol, polytetramethylene glycol, polyoxyethylene oleyl ether, polyoxyethylene stearyl ether, polyoxyethylene lauryl ether, polyoxyethylene dodecyl ether, polyoxyethylene nonylphenyl ether, polyoxyethylene octylphenyl ether and polyoxyethylene-polyoxypropylene block copolymer. Polyethylene glycol is especially preferred among these. Such surfactants may be used alone, or two or more may be used in combination.

Polyether-based surfactants are available as commercial products, examples of such commercial products including E-D052, E-D054 and E-F010 (San Nopco, Ltd.).

A silicone-based surfactant may be linear, branched-chain or cyclic so long as it includes at least a silicone chain, and it may include hydrophobic groups or hydrophilic groups. Specific examples of hydrophobic groups include alkyl groups such as methyl, ethyl, n-propyl, isopropyl, n-butyl, sec-butyl, tert-butyl, n-pentyl, n-hexyl, n-heptyl, n-octyl, n-nonyl and n-decyl; cycloalkyl groups such as cyclohexyl; and aromatic hydrocarbon groups such as phenyl. Specific examples of hydrophilic groups include amino, thiol, hydroxyl, alkoxy, carboxylic acid, sulfonic acid, phosphoric acid and nitric acid groups, as well as their organic salts or inorganic salts, and ester, aldehyde, glycerol and heterocyclic groups. Representative examples of silicone-based surfactants include dimethylsilicone, methylphenylsilicone, chlorophenylsilicone, alkyl-modified silicone, fluorine-modified silicone, amino-modified silicone, alcohol-modified silicone, phenol-modified silicone, carboxy-modified silicone, epoxy-modified silicone, fatty acid ester-modified silicone and polyether-modified silicone.

Silicone-based surfactants are available as commercial products, examples of such commercial products including BYK-300, BYK-301, BYK-302, BYK-306, BYK-307, BYK-310, BYK-313, BYK-320BYK-333, BYK-341, BYK-345, BYK-346, BYK-347, BYK-348 and BYK-349 (all trade names of Byk-Chemie, Japan), KM-80, KF-351A, KF-352A, KF-353, KF-354L, KF-355A, KF-615A, KF-945, KF-640, KF-642, KF-643, KF-6020, X-22-4515, KF-6011, KF-6012, KF-6015 and KF-6017 (all trade names of Shin-Etsu Chemical Co., Ltd.), SH-28PA, SH8400, SH-190 and SF-8428 (all trade names of Dow Corning Toray), POLYFLOW KL-245, POLYFLOW KL-270 and POLYFLOW KL-100 (all trade names of Kyoeisha Chemical Co., Ltd.), and SILFACE SAG002, SILFACE SAG005 and SILFACE SAG0085 (all trade names of Nisshin Chemical Industry Co., Ltd.).

(Covering Layer Amount)

The amount of covering layer on the substrate, i.e. the amount of covering layer per unit area on one surface of the substrate, is preferably 0.5 $g/m^2$ or greater or more preferably 1.0 $g/m^2$ or greater by weight, and preferably 0.15 $cm^3/m^2$ or greater and more preferably 0.30 $cm^3/m^2$ or greater by volume. The upper limit for the amount of covering layer is preferably 10.0 $g/m^2$ or lower and more preferably 7.0 $g/m^2$ or lower, by weight, or 3.50 $cm^3/m^2$ or lower by volume, or 2.50 $cm^3/m^2$ or lower by volume. The amount of covering layer is preferably above this lower limit from the viewpoint of improving adhesive force between the covering layer and electrodes, and inhibiting heat shrinkage. The amount of covering layer is also preferably below this upper limit from the viewpoint of inhibiting reduction in ion permeability.

(Covering Layer Thickness)

The thickness on at least one covering layer disposed on at least one substrate is preferably 0.3 μm to 5.0 μm, more preferably 0.5 μm to 2.5 μm and even more preferably 0.7 μm to 1.3 μm. A covering layer thickness of 0.3 μm or greater can further reduce the heat shrinkage factor and will tend to result in uniform adhesive force between the electrodes and substrate, thus improving the power storage device properties. A covering layer thickness of 1.3 μm or smaller is preferred because it can inhibit reduction in ion permeability and allows a thin separator for a power storage device to be obtained. In other words, by reducing the thickness of the separator it is possible to produce a power storage device with a large capacity per volume. It is preferably 1.6 μm or greater or 2.1 μm or greater from the viewpoint of preventing the polymer particles from being shed from the covering layer. The thickness of the covering layer can be adjusted by varying the type or concentration of the polymer particles in the coating solution to be coated onto the substrate, the amount of coating solution applied, the coating method and the coating conditions. The method of adjusting the thickness of the covering layer is not limited to these, however.

FIG. 1 is a schematic view of the surface of the covering layer on the separator for a power storage device of the embodiment. As shown schematically in FIG. 1, the surface of the covering layer (10) has an inorganic filler (1) and polymer particles composed of a thermoplastic polymer (2) protruding from the covering layer. In FIG. 1, the polymer particles are present as primary particles without aggregation with other polymer particles.

Figure 2:
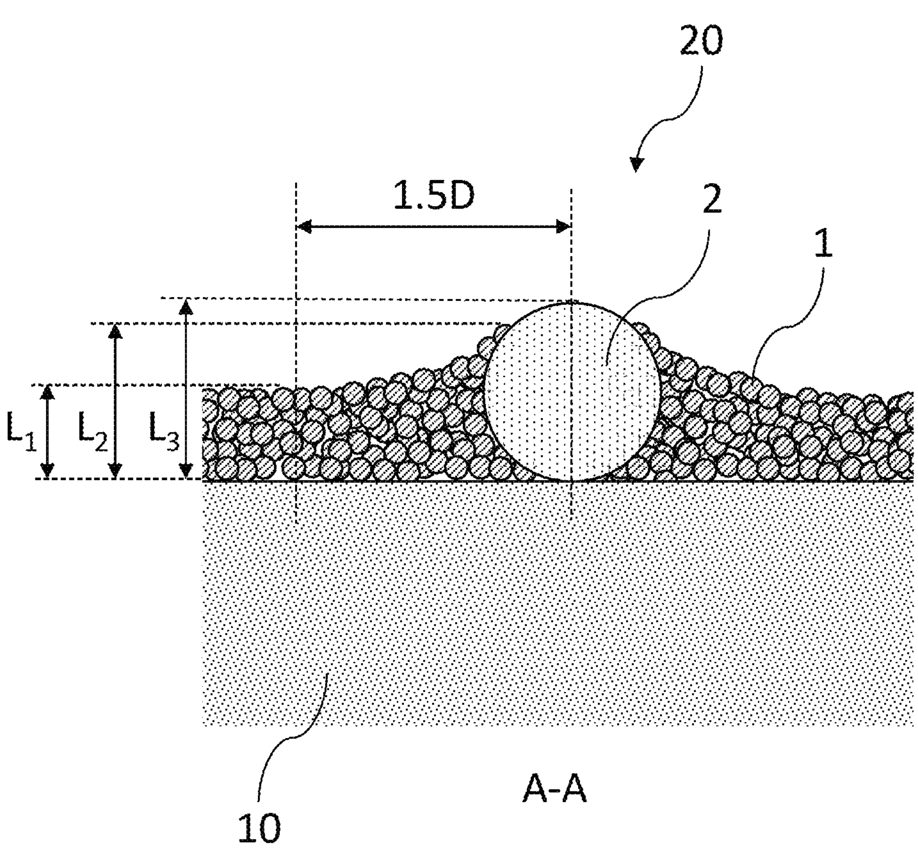
FIG. 2 is a cross-sectional view along line A-A of FIG. 1.

FIG. 2 is a cross-sectional view of the separator for a power storage device of FIG. 1, along line A-A. As shown schematically in FIG. 2, the covering layer (20) is formed in an inclined manner, so that it continuously thickens toward the protruding polymer particles (2), from the inorganic filler portion at a distance of at least 1.5D in the horizontal direction (the in-plane direction of the covering layer) from the center of volume of each polymer particle. The inclination of the inclined covering layer may be gentle away from the protruding polymer particles, and more rapid as it approaches the protruding polymer particles. The inorganic filler (1) covers parts of the perimeter edges of the protruding sections in a manner riding along the outlines of the polymer particles, with the areas nears the centers of the protruding sections exposed on the surface of the covering layer.

Method for Producing Separator for Power Storage Device

Method for Producing Substrate

The method for producing the substrate is not particularly restricted, and may be any known production method, examples including wet pore-forming methods and dry pore-forming methods. When the substrate is a polyolefin microporous membrane, examples of wet pore-forming methods include a method of melt kneading a polyolefin resin composition and a plasticizer and molding the mixture into a sheet, optionally with stretching, and then extracting the plasticizer to form pores; a method of melt kneading a polyolefin resin composition that includes a polyolefin-based resin as the major component, extruding it at a high draw ratio, and then stretching it with heat treatment to detach the polyolefin crystal interface and form pores; a method of melt kneading a polyolefin resin composition and an inorganic filler and casting the mixture into a sheet, and then detaching the interface between the polyolefin and the inorganic filler by stretching to form pores; and a method of first dissolving the polyolefin resin composition, and then dipping it in a poor solvent for the polyolefin to solidify the polyolefin while simultaneously removing the solvent, to form pores.

The method of fabricating the substrate may also be a known method. The fabrication method may be, for example, a chemical bond method in which a web is immersed in a binder and dried to produce bonding between the fibers; a thermal bond method in which heat-fusible fibers are mixed into a web and the fibers are partially melted to produce bonding between the fibers; a needle punching method in which a web is repeatedly pierced with a puncturing needle to mechanically tangle the fibers; or a hydroentangling method in which a high-pressure water stream is sprayed from a nozzle onto a web through a net (screen), producing tangling between the fibers.

An example of a method of producing the polyolefin microporous membrane will now be described, as a method of melt kneading a polyolefin resin composition and a plasticizer, casting the mixture into a sheet, and then extracting the plasticizer. First, the polyolefin resin composition and the plasticizer are melt kneaded. In the melt kneading method, a polyolefin resin and other additives as necessary may be loaded into a resin kneader such as an extruder, kneader, Laboplastomil, kneading roll or Banbury mixer, and the plasticizer introduced at a desired proportion and kneaded in while hot melting the resin components. Before loading the polyolefin resin, the other additives and the plasticizer into the resin kneader, they are preferably pre-kneaded in a prescribed proportion using a Henschel mixer or the like. More preferably, only a portion of the plasticizer is loaded in during the pre-kneading, while the remainder of the plasticizer is kneaded in while side feeding it to the resin kneader.

The plasticizer used may be a non-volatile solvent that can form a homogeneous solution at or above the melting point of the polyolefin. Examples of plasticizers include hydrocarbons such as liquid paraffin and paraffin waxes; esters such as dioctyl phthalate and dibutyl phthalate; and higher alcohols such as oleyl alcohol and stearyl alcohol. Liquid paraffin is preferred among these.

The proportion of the polyolefin resin composition and the plasticizer is not particularly restricted so long as it is in a range in which they can undergo uniform melt kneading to then be cast into a sheet form. For example, the mass fraction of the plasticizer in the composition comprising the polyolefin resin composition and the plasticizer is preferably 30 parts by weight to 80 parts by weight and more preferably 40 parts by weight to 70 parts by weight. The mass fraction of the plasticizer is preferably within this range from the viewpoint of both melt tension during melt molding, and formation of a homogeneous and fine pore structure.

The melt kneaded mixture obtained by hot melting and kneading in this manner is cast into a sheet. The method of producing the cast sheet may be, for example, a method of extruding the melt kneaded mixture through a T-die or the like into a sheet, and contacting it with a heat conductor to cool it to a sufficiently lower temperature than the crystallization temperature of the resin component, thereby solidifying it. The heat conductor used for the cooling solidification may be metal, water, air or the plasticizer itself, but a metal roll is preferred because it has high heat conduction efficiency. When the melt kneaded mixture is to be contacted with metal rolls, it is more preferably sandwiched between the rolls because this will further increase the heat conduction efficiency while causing the sheet to become oriented and increasing the film strength, and the surface smoothness of the sheet will also be improved. The die lip gap when extruding into a sheet from a T-die is preferably from 400 μm to 3000 μm and more preferably from 500 μm to 2500 μm.

The cast sheet obtained in this manner is then preferably stretched. Both uniaxial stretching and biaxial stretching are suitable for the stretching treatment. Biaxial stretching is preferred from the viewpoint of the strength of the obtained microporous membrane. When a cast sheet is subjected to high-ratio stretching in the biaxial directions, the molecules become oriented in the in-plane direction, such that the porous substrate that is obtained as the final result is less likely to tear, and has high puncture strength. Examples of stretching methods include simultaneous biaxial stretching, sequential biaxial stretching, multistage stretching and repeated stretching.

Simultaneous biaxial stretching is preferred from the viewpoint of increasing the puncture strength and obtaining greater uniformity during stretching and superior shutdown properties.

The stretch ratio is an area increase by a factor of preferably in the range of 20 to 100, and more preferably in the range of 25 to 50. The stretch ratio in each axial direction is preferably in the range of 4 to 10 in the MD direction and 4 to 10, inclusive, in the TD direction, and more preferably in the range of 5 to 8 in the MD direction and 5 and 8 in the TD direction. The stretch ratio is preferably within this range, because it will be possible to impart more sufficient strength while preventing film breakage in the stretching step and obtaining high productivity. The term "MD direction" means the "machine direction" when the polyolefin microporous membrane is being continuously cast, and the term "TD direction" means the direction crossing the MD direction at an angle of 90°.

The cast sheet obtained as described above may also be subjected to rolling. Rolling may be carried out, for example, by a press method using a double belt press machine or the like. Rolling can increase the orientation of the surface layer part of the cast sheet. The area increase by rolling is preferably by a factor of greater than 1 and not more than 3, and more preferably a factor of greater than 1 and not more than 2. The area increase by rolling is preferably within this range from the viewpoint of increasing the film strength of the porous substrate that is obtained at the final stage, and allowing formation of a porous structure that is uniform in the thickness direction of the film.

The plasticizer is then removed from the cast sheet to obtain a porous substrate. The method of removing the plasticizer may be, for example, a method of immersing the cast sheet in an extraction solvent to extract the plasticizer, and then thoroughly drying it. The method of extracting the plasticizer may be either a batch process or a continuous process. In order to minimize contraction of the porous substrate, it is preferred to constrain the edges of the cast sheet during the series of steps of immersion and drying. Removal of the plasticizer is preferably carried out to control the amount of plasticizer to 0.1 parts by weight to 1.6 parts by weight and more preferably 0.2 parts by weight to 1.2 parts by weight or 0.3 parts by weight to 1.0 parts by weight, based on the total weight of the substrate that is obtained. If the plasticizer amount is within this range, battery internal resistance can be lowered while increasing the binding force between the substrate and covering layer.

The extraction solvent used is preferably one that is a poor solvent for the polyolefin resin and a good solvent for the plasticizer, and that has a boiling point that is lower than the melting point of the polyolefin resin. Examples of such extraction solvents include hydrocarbons such as n-hexane and cyclohexane; halogenated hydrocarbons such as methylene chloride and 1,1,1-trichloroethane; non-chlorine-based halogenated solvents such as hydrofluoroethers and hydrofluorocarbons; alcohols such as ethanol and isopropanol; ethers such as diethyl ether and tetrahydrofuran; and ketones such as acetone and methyl ethyl ketone. These extraction solvents may be collected by a process such as distillation and then reutilized.

In order to minimize shrinkage of the porous substrate, heat treatment such as heat setting or thermal relaxation may be carried out, either after the stretching step or after formation of the porous substrate. The porous substrate may also be subjected to post-treatment such as hydrophilicizing treatment with a surfactant, or crosslinking treatment with ionizing radiation.

The following is an example of a dry pore-forming method different from the wet pore-forming method described above. First, a film is fabricated by melt kneading in an extruder without using a solvent followed by direct stretching orientation, after which it is subjected to an annealing step, cold drawing step and hot-rolling/stretching step to produce a microporous membrane. The dry pore-forming method may be a method of stretching orientation of the molten resin from an extruder through a T-die, or an inflation method, with no limitation to these methods.

Covering Layer Placement Method

The covering layer is disposed on at least one side of the substrate produced as described above. The method for disposing the covering layer is not particularly restricted, and an example is a method of applying a coating solution comprising the inorganic filler and polymer particles onto the substrate.

The coating solution used may be a dispersion of the inorganic filler and polymer particles in a solvent or dispersing medium in which the polymer particles do not dissolve (hereunder also referred to simply as "medium"). Preferably, the polymer particles are synthesized by emulsion polymerization, and the emulsion obtained by the emulsion polymerization may be directly used as the coating solution.

The medium for the coating solution is preferably one that can uniformly and stably disperse or dissolve the inorganic filler, polymer particles and if necessary the water-soluble polymer, and examples include N-methylpyrrolidone, N,N-dimethylformamide, N,N-dimethyl acetamide, water, ethanol, methanol, toluene, hot xylene, methylene chloride and hexane. The medium of the coating solution is preferably water or a mixed medium comprising water and a water-soluble organic medium. The water-soluble organic medium is not particularly restricted, and it may be ethanol or methanol, for example. Water is more preferred among those mentioned above. If the coating solution infiltrates to the interior of the substrate when it is coated onto the substrate, the polymer particles including the polymer will tend to obstruct the surfaces and interiors of the substrate pores, thus lowering the permeability. With an aqueous dispersion using water as the medium for the coating solution, the coating solution will be less likely to infiltrate to the interior of the substrate and the polymer particles including the copolymer will be less likely to be present on the outer surface of the substrate, and therefore water is preferred to effectively minimize reduction in permeability.

The coating solution may also contain various additives including dispersing agents such as surfactants; thickeners; moistening agents; antifoaming agents; and pH adjusters that contain acids or alkalis.

The method of dispersing or dissolving the inorganic filler, the polymer particles and if necessary the water-soluble polymer in the medium of the coating solution may be, for example, a mechanical stirring method using a ball mill, bead mill, planetary ball mill, vibrating ball mill, sand mill, colloid mill, attritor, roll mill, high-speed impeller disperser, disperser, homogenizer, high-speed impact mill, ultrasonic disperser or stirring blade.

As the procedure for forming the coating solution, preferably first the water-soluble polymer is added to a coating solution in which the inorganic filler is dispersed, and then the resin binder and polymer particles are added. Forming the coating solution in this order will allow the water-soluble polymer to adsorb and protect the metal ions in the inorganic filler, helping to prevent aggregation of the resin binder or polymer particles.

The viscosity of the coating solution is preferably 20 mPa·s to 80 mPa·s, more preferably 60 mPa·s or lower and even more preferably 40 mPa·s or lower. A coating solution viscosity of 20 mPa·s to 80 mPa·s is preferred from the viewpoint of speeding precipitation of the polymer particles and increasing the slope of the covering layer during the process of forming the covering layer as the solvent is removed from the coated film after application, and from the viewpoint of increasing the contact ratio between the polymer particles and substrate surface.

The substrate may also be surface-treated before coating. Surface treatment is preferred as it will help to facilitate application of the coating solution while increasing adhesion between the substrate and thermoplastic polymer and helping to control the 1800 peel strength to 200 gf/cm or greater. The method of surface treatment may be, for example, corona discharge treatment, plasma treatment, mechanical roughening, solvent treatment, acid treatment or ultraviolet oxidation. Corona discharge treatment may be carried out as the surface treatment.

The method of applying the coating solution onto the substrate is not particularly restricted so long as it can result in the desired coating pattern, coated film thickness and coating area. Examples include gravure coater methods, small-diameter gravure coater methods, reverse roll coater methods, transfer roll coater methods, kiss coater methods, dip coater methods, knife coater methods, air doctor coater methods, blade coater methods, rod coater methods, squeeze coater methods, cast coater methods, die coater methods, screen printing methods, spray coating methods and ink-jet coating methods. Preferred among these are gravure coater methods or spray coating methods, from the viewpoint of a high degree of freedom for the coating shape of the polymer particles, and in order to easily obtain the preferred area ratio.

The coating is preferably at a high shear rate by a method such as gravure coating, with a shear rate of preferably 40,000 $sec^{-1}$ to 120,000 $sec^{-1}$. If the shear rate is within this range the dispersion of the primary polymer particles will be satisfactory and the 180° peel strength can be more easily controlled to 200 gf/cm or greater.

The method of removing the medium from the coated film after coating is not particularly restricted so long as it is a method that does not adversely affect the substrate and covering layer. For example, it may be a method of drying the substrate at a temperature below its melting point while anchoring it, a method of reduced pressure drying at low temperature, or a method of immersion in a medium that is a poor solvent for the polymer particles to solidify the polymer particles as particles, while simultaneously extracting out the medium.

Fabrication of Wound Separator

The separator for a power storage device that is obtained is preferably wound into a wound body. Preparing the separator as a wound body will allow rapid and convenient reeling out to increase productivity during production of a power storage device.

Power Storage Device

The power storage device of the embodiment comprises a separator for a power storage device of the embodiment. There are no particular restrictions on the power storage device, and examples include batteries such as nonaqueous electrolyte solution secondary batteries, as well as condensers and capacitors. In order to maximize the advantages of the separator for a power storage device of the embodiment, a battery is preferred, a nonaqueous electrolyte solution secondary battery is more preferred, and a lithium ion secondary battery is even more preferred. A lithium ion secondary battery has a positive electrode, a negative electrode, a separator for a power storage device of the embodiment disposed between the positive electrode and negative electrode, and a nonaqueous electrolyte solution. The power storage device of the embodiment which comprises a separator for a power storage device exhibits excellent properties such as storage performance, and also exhibits excellent battery characteristics when used as a lithium ion secondary battery.

When the power storage device of the embodiment is a lithium ion secondary battery, there are no restrictions for the positive electrode, negative electrode and nonaqueous electrolyte solution, and any publicly known ones may be used. The positive electrode used may be a positive electrode having a positive electrode active material layer comprising a positive electrode active material formed on a positive electrode collector. The positive electrode collector may be aluminum foil, for example. The positive electrode active material may be a lithium-containing complex oxide such as $LiCoO_2$, $LiNiO_2$, spinel $LiMnO_4$ or olivine-type $LiFePO_4$, for example. The positive electrode active material layer may include a binder and a conductive material in addition to the positive electrode active material, as suitable.

The negative electrode used may be a negative electrode having a negative electrode active material layer comprising a negative electrode active material formed on a negative electrode collector. The negative electrode collector may be copper foil, for example. Examples for the negative electrode active material include carbon materials such as graphite, non-graphitizable carbon materials, easily graphitizable carbon materials and complex carbon; or silicon, tin, metal lithium and various alloy materials.

There are no particular restrictions on the nonaqueous electrolyte solution, and an electrolyte solution comprising an electrolyte dissolved in an organic solvent may be used. Examples of organic solvents include propylene carbonate, ethylene carbonate, dimethyl carbonate, diethyl carbonate and ethylmethyl carbonate. Examples of electrolytes include lithium salts such as $LiClO_4$, $LiBF_4$ and $LiPF_6$.

Method for Producing Power Storage Device

There are no particular restrictions on the method of producing a power storage device using the separator of the embodiment. The following methods may be mentioned as examples. First, a separator of the embodiment is produced by the method described above. The size and shape of the separator may be longitudinal with a width of 10 to 500 mm and preferably 80 to 500 mm, and a length of 200 to 10,000 m and preferably 1,000 to 6,000 m. Next, lamination may be carried out in the order: positive electrode-separator-negative electrode-separator or negative electrode-separator-positive electrode-separator, and the laminate may be wound into a circular or flat spiral form to obtain a wound body. The wound body may be housed in a device can (for example, a battery can) and an electrolyte solution may further be injected. Alternatively, the separator can be produced by a method in which a wound body obtained by folding electrodes and separators is placed in a device container (for example, an aluminum film), which is then filled with an electrolyte solution.

The wound body may also be pressed during this time. A specific example is a method in which the separator is overlaid and pressed with an electrode having a collector and an active material layer formed on at least one side of the collector, so that the covering layer and the active material layer are facing each other.

The pressing temperature is preferably a temperature of at least $T_{1.00}$, as a temperature allowing effective adhesion. The temperature $T_{1.00}$ is the temperature at which DDSC from 0° C. to 150° C. is minimum, where DDSC is the value of heat flux per unit time as measured by DSC (differential scanning calorimetry), differentiated with respect to temperature. Pressing at a temperature of $T_{1.00}$ or higher allows adequate deformation of the covering layer and yields satisfactory adhesive force. The temperature is preferably 35° C. or higher. From the viewpoint of inhibiting blocking or heat shrinkage of the pores in the separator by hot pressing, the pressing temperature is preferably lower than the melting point of the material in the substrate, and more preferably 130° C. or lower. The pressing pressure is preferably 20 MPa or lower from the viewpoint of inhibiting blocking of the pores of the separator. The pressing time may be up to 1 second when a roll press is used, or several hours for surface pressing, but from the viewpoint of productivity it is preferably no longer than 2 hours. Using the separator for a power storage device of the embodiment in the production process described above can reduce press back during press molding of a wound body comprising electrodes with the separator. It thus becomes possible to inhibit yield reduction in the device assembly steps and shorten the production process time.

Adhesion can also be exhibited for the wound body without pressing. As a specific example, the method may be one in which, when the power storage device is fabricated by housing a wound body in a device can and injecting an electrolyte solution into it, adhesion is produced between the covering layer of the separator and the facing electrode by pressure generated in the device can, or pressure created by expansion and contraction of the electrodes during charge-discharge of the power storage device.

Since a power storage device, and especially a lithium ion secondary battery, produced in this manner is provided with a separator of the embodiment having high adhesion with electrodes and a low heat shrinkage factor, it exhibits excellent battery characteristics (rate characteristic) and long-term, continuous operating resistance (cycle characteristic).

EXAMPLES

Embodiments of the invention will now be explained in detail by Examples and Comparative Examples, with the understanding that the present disclosure is not limited to these Examples and Comparative Examples.

Measurement and Evaluation Methods

Covering Layer Thickness and Degree of Polymer Particle Protrusion

A separator was freeze fractured and the cross-section was observed with a SEM (model S-4800 by Hitachi). The thickness of the thermoplastic polymer-containing layer was measured from the obtained visual field. Specifically, the separator sample was cut out to about 1.5 mm×2.0 mm and dyed with ruthenium. The dyed sample was placed in a gelatin capsule together with ethanol and frozen with liquid nitrogen, after which the sample was fractured using a hammer. The fractured sample was vapor deposited with osmium and observed at 30,000× at an acceleration voltage of 1.0 kV. The distance from the substrate-covering layer boundary to the outer surface of the covering layer at the inorganic filler portion of the covering layer in the SEM photograph was measured as the thickness (μm) of the covering layer. The term "inorganic filler portion" means the portion separated by at least 1.5D from the center of each protruding polymer particle, where D is the diameter of each protruding polymer particle. The "diameter of each protruding polymer particle" was measured as the circle equivalent diameter. The thickness of the covering layer was measured at 20 points and the average value was calculated. The maximum distance (μm) was measured from the substrate-covering layer boundary to the outline of the polymer particle at the portion where the polymer particle protruded from the covering layer. The maximum distance to the outline of the polymer particle was measured at 20 points and the average value was calculated. The thickness of the inorganic filler portion of the covering layer was subtracted from the maximum distance to the outline of the polymer particle to calculate the degree of polymer particle protrusion (μm), and the ratio of the degree of polymer particle protrusion with respect to the thickness of the inorganic filler portion of the covering layer was calculated.

180° Peel Strength

The side of a separator piece cut out to 2 mm×7 mm, opposite the covering layer measured side, was attached to a glass plate using double-sided tape, and tape (product name: "Mending Tape MP-12" by 3M) was attached to the covering layer. A 5 mm portion at the tip of the tape was peeled off, and using a tensile tester (model AG-IS, SLBL-1kN by Shimadzu Corp.), one end of the tape was gripped with a chuck, peeling the tape at an angle of 180° with respect to the in-plane direction of the separator, as a tensile test to measure the tensile strength (N/m). The pull rate was 50 mm/sec, the temperature was 250 and the relative humidity was 40%.

Covering Layer Slope

A separator was freeze fractured and the cross-section was observed with a SEM (model S-4800 by Hitachi). The thickness of the thermoplastic polymer-containing layer was measured from the obtained visual field. Specifically, the separator sample was cut out to about 1.5 mm×2.0 mm and dyed with ruthenium. The dyed sample was placed in a gelatin capsule together with ethanol and frozen with liquid nitrogen, after which the sample was fractured using a hammer. The fractured sample was vapor deposited with osmium and observed at 30,000× at an acceleration voltage of 1.0 kV. As shown schematically in FIG. 2, in the SEM photograph of the fractured sample cross-section, the distance from the substrate-covering layer boundary to the outer surface of the covering layer at the inorganic filler portion of the covering layer was calculated as the thickness L1 (μm) of the inorganic filler portion of the covering layer. The term "inorganic filler portion" means the portion separated by at least 1.5D from each protruding polymer particle, where D is the volume-average particle size of the protruding polymer particle. The maximum distance L2 (μm) from the substrate-covering layer boundary to the outer surface of the inorganic filler of the covering layer formed in the inclined manner and the maximum distance L3 (μm) to each protruding polymer particle outline were likewise measured, and the slope L2/L1 of the covering layer and the coverage factor (L2−L1)/(L3−L1) of the protruding section were calculated. The slope L2/L1 of the covering layer and the coverage factor (L2−L1)/(L3−L1) of the protruding section were measured at 200 points and the average value was calculated.

Contact Ratio Between Protruding Polymer Particles and Substrate

A separator was freeze fractured and the cross-section was observed with a SEM (model S-4800 by Hitachi). The thickness of the thermoplastic polymer-containing layer was measured from the obtained visual field. Specifically, the separator sample was cut out to about 1.5 mm×2.0 mm and dyed with ruthenium. The dyed sample was placed in a gelatin capsule together with ethanol and frozen with liquid nitrogen, after which the sample was fractured using a hammer. The fractured sample was vapor deposited with osmium and observed at 30,000× at an acceleration voltage of 1.0 kV. The number of particles contacting with the substrate were counted from among the 200 polymer particle fracture cross-sections among the polymer particles protruding from the thickness of the inorganic filler portion of the covering layer in the SEM photograph, and the number was recorded as the contact ratio between the protruding polymer particles and the substrate.

Proportion of Number of Polymer Particles Protruding from Thickness of Inorganic Filler Portion of Covering Layer A separator was freeze fractured and the cross-section was observed with a SEM (model S-4800 by Hitachi). The thickness of the thermoplastic polymer-containing layer was measured from the obtained visual field. Specifically, the separator sample was cut out to about 1.5 mm×2.0 mm and dyed with ruthenium. The dyed sample was placed in a gelatin capsule together with ethanol and frozen with liquid nitrogen, after which the sample was fractured using a hammer. The fractured sample was vapor deposited with osmium and observed at 30,000× at an acceleration voltage of 1.0 kV. Upon observing 200 polymer particles in the fracture cross-section in the SEM photograph, the number of polymer particles protruding from the thickness of the inorganic filler portion of the covering layer was counted and recorded as the number of polymer particles protruding from the thickness of the inorganic filler portion of the covering layer.

Average Number of Adjacent Polymer Particles

The surface of an osmium-vapor deposited separator for a power storage device was subjected to element mapping by scanning electron microscopy (SEM) (model "SU-8220"

by Hitachi) and energy dispersive X-ray spectroscopy (EDX) (model "ULTIM EXTREME" by Oxford Instruments Co.). The SEM detector was used for mapping measurement of carbon atoms at a magnification of 10,000×, with secondary electron selection, an acceleration voltage of 3 kV and 20 mapping scans. Considering each apparent circular portion to be one polymer particle for carbon atom mapping, the number of particles with distances of 0.2 μm or less between the outer edges were counted from among all of the polymer particles in a single visual field. The measurement was carried out for 3 visual fields and the average value for all of the measurements was recorded as the average number of adjacent polymer particles.

Ratio of Mean Particle Size of Protruding Polymer Particles with Respect to Mean Particle Size of Inorganic Filler A cross-section of an osmium vapor deposited separator for a power storage device was measured by observation using a scanning electron microscope (SEM) (model "5-4800" by Hitachi) at 10,000× with an acceleration voltage of 1.0 kV. Specifically, the circle equivalent diameter was measured for 200 arbitrary inorganic filler particles, determining the volume-average particle size MV from the values and calculating the mean particle size. Similarly, a SEM image of a cross-section of the osmium vapor deposited separator for a power storage device was observed, and the circle equivalent diameters of 200 polymer particles protruding from the thickness of the inorganic filler portion of the covering layer were measured, calculating the volume-average particle size MV from their values and recording it as the mean particle size. The ratio of the mean particle size of the protruding polymer particles with respect to the mean particle size of the inorganic filler was calculated from the mean particle size of the inorganic filler and the mean particle size of the polymer particles determined by the method described above.

Number of Polymer Particles within 10 μm Radius

The surface of an osmium-vapor deposited separator for a power storage device was subjected to element mapping by scanning electron microscopy (SEM) (model "SU-8220" by Hitachi) and energy dispersive X-ray spectroscopy (EDX) (model "ULTIM EXTREME" by Oxford Instruments Co.). The SEM detector was used for mapping measurement of carbon atoms at a magnification of 50,000,000×, with secondary electron selection, an acceleration voltage of 3 kV and 20 mapping scans. Considering each apparent circular portion to be one polymer particle for carbon atom mapping, the number of polymer particles within a radius of 10 μm from any arbitrary polymer particle was measured for all of the polymer particles in a single visual field, and the average value was calculated.

Measurement of Methylene Chloride-Soluble Portion

The methylene chloride-soluble portion in the substrate and separator was measured by the following method. The substrate or separator sampled at 100×100 mm was neutralized and weighed using a fine balance ($W_0$ (g)). Next, 200 ml of methylene chloride was added to the sealed container and the separator was immersed for 15 minutes at room temperature. The separator was then removed out, dried at room temperature for 3 hours and neutralized in the same manner, and then weighed using a fine balance ($W_1$ (g)). The methylene chloride-soluble portion was calculated by the following formula.

$$\text{Methylene chloride-soluble portion } (\%)=\{(W_1-W_0)/W_0\}\times 100$$

Total Amount of Metal Cations

A 0.60 g portion of the separator was taken into a TEFLON™ pressurized decomposition container, and after adding 10 ml of sulfuric acid, it was sealed and heat treated for 15 hours in an air bath at 200° C. After cooling, the solution in the container was transferred to a 100 ml graduated resin flask and adjusted upward to prepare a sample solution. The sample solution was measured by inductively coupled plasma optical emission spectrometry (ICP-OES) (model "ICPE-9000" by Shimadzu Corp.), and the calibration curve prepared from a standard solution was used to calculate the amount of each element.

Heat Shrinkage Factor

A multilayer porous membrane sample was cut out to 100 mm in the MD direction and 100 mm in the TD direction, and allowed to stand for 1 hour in an oven at 130° C. or 150° C. During this time, the sample was sandwiched between two sheets of paper so as to avoid direct contact of the sample with warm air. After removing the sample from the oven and cooling it, the length (mm) was measured and the heat shrinkage factor was calculated by the following formula. Measurement was in both the MD direction and TD direction, with the larger value being recorded as the heat shrinkage factor.

$$\text{Heat shrinkage factor } (\%)=\{(100-\text{length after heating})/100\}\times 100$$

Substrate Porosity

A 10 cm×10 cm-square sample was cut out from the substrate, and the volume ($cm^3$) and weight (g) were determined. The values were used to calculate the porosity by the following formula, using 0.95 ($g/cm^3$) as the density of the substrate.

$$\text{Porosity } (\%)=(1-\text{weight}/\text{volume}/0.95)\times 100$$

Air Permeability

The air permeability of the substrate and separator for a power storage device was determined as the air permeability resistance measured with a Gurley air permeability tester (G-B2™ by Toyo Seiki Kogyo Co., Ltd.), according to JIS P-8117. When the covering layer is only present on one side of the substrate, the needle may be used to pierce the side where the covering layer is present.

Thickness of Substrate or Separator

A 10 cm×10 cm-square sample was cut out from the substrate or separator, 9 locations (3 points×3 points) were selected in a lattice form, and a microthickness meter (Type KBM by Toyo Seiki Seisakusho, Ltd.) was used for measurement of the thickness (μm) at room temperature (23±2° C.). The average for the values measured at the 9 locations was calculated as the thickness of the substrate or separator.

Puncture Strength

Using a Handy Compression Tester KES-G5 (model name) by Kato Tech Corp., the substrate was anchored with a specimen holder having an opening diameter of 11.3 mm. The center section of the anchored substrate was then subjected to a puncture test with a needle having a tip curvature radius of 0.5 mm, at a puncture speed of 2 mm/sec in a 25° C. atmosphere, to measure the maximum puncture load. The value of the maximum puncture load per 20 μm thickness was recorded as the puncture strength (gf/20 μm). When the thermoplastic polymer is only present on one side of the substrate, the needle may be used for piercing from the side where the thermoplastic polymer is present.

Mean Pore Size of Polyolefin Microporous Membrane

It is known that a fluid inside a capillary follows a Knudsen flow when the mean free path of the fluid is larger than the pore diameter of the capillary, and a Poiseuille flow when it is smaller. It is thus theorized that the flow of air during measurement of the air permeability of a thermoplastic polymer-containing layer follows a Knudsen flow, while the flow of water during measurement of the water permeability of a substrate follows a Poiseuille flow.

In this case, the mean pore size d (μm) of the polyolefin microporous membrane can be calculated by the following formula, from the permeation rate constant for air $R_{gas}$ ($m^3/(m^2 \cdot sec \cdot Pa)$), the permeation rate constant for water $R_{liq}$ ($m^3/(m^2 \cdot sec \cdot Pa)$), the molecular speed of air v (m/sec), the viscosity of water η (Pa·sec), standard pressure $P_S$ (=101,325 Pa), the porosity ε (%) and the film thickness L (μm).

$$d=2v\times(R_{liq}/R_{gas})\times(16\eta/3Ps)\times10^6$$

$R_{gas}$ in these formulas was calculated from the air permeability (sec) using the following formula.

$$R_{gas}=0.0001/(\text{air permeability}\times(6.424\times10^{-4})\times(0.01276\times101325))$$

$R_{liq}$ was calculated from the water permeability ($cm^3/(cm^2 \cdot sec \cdot Pa)$) using the following formula.

$$R_{liq}=\text{Water permeability}/100$$

The water permeability was determined in the following manner. The thermoplastic polymer-containing layer that had been immersed beforehand in ethanol was set in a stainless steel permeable cell with a diameter of 41 mm, and after washing the ethanol of the layer with water, water was permeated through at a differential pressure of about 50,000 Pa and the water permeation per unit time, per unit pressure and per unit area was calculated from the water permeation ($cm^3$) after elapse of 120 sec, and recorded as the water permeability.

In addition, v was calculated using the following formula, from the gas constant R (=8.314), the absolute temperature T (K), the circular constant π and the average molecular weight of air M (=$2.896\times10^{-2}$ kg/mol).

$$v=((8R\times T)/(\pi\times M))^{1/2}$$

Glass Transition Temperature of Thermoplastic Polymer

A suitable amount of an aqueous dispersion containing the thermoplastic polymer (solid content=38 to 42 parts by weight, pH=9.0) was dispensed into an aluminum pan and allowed to stand at ordinary temperature for 24 hours to obtain a dry film. Approximately 17 mg of the dried film was packed into a measuring aluminum container, and the DSC curve and DDSC curve were obtained using a DSC measuring apparatus (model DSC6220 by Shimadzu Corp.) under a nitrogen atmosphere. The measuring conditions were as follows.

Stage 1 heating program: Start=30° C., heating at 10° C./min. Temperature maintained for 5 minutes after reaching 150° C.

Stage 2 cooling program: Cooling from 110° C. at 10° C./min. Temperature maintained for 5 minutes after reaching −50° C.

Stage 3 heating program: Heating from −50° C. to 150° C. at 10° C./min. Recording of DSC and DDSC data during stage 3 temperature increase.

The glass transition temperature was determined from the obtained DSC curve by the method of JIS-K7121. Specifically, the value used for the glass transition temperature (Tg) was the temperature at the intersection between a straight line extending the low-temperature end baseline in the DSC curve toward the high-temperature end, and the curve at the portion of glass transition that changes in a stepwise manner with respect to a straight line equidistant in the vertical axis direction from a straight line extending the high-temperature end baseline in the DSC curve toward the low-temperature end.

Aspect Ratio of Inorganic Filler in Covering Layer

The surface of an osmium vapor deposited separator for a power storage device was measured by observation using a scanning electron microscope (SEM) (model "S-4800" by Hitachi) at 10,000× with an acceleration voltage of 1.0 kV. The aspect ratio was calculated by image processing of a SEM photograph of the inorganic filler in the covering layer. In cases where the inorganic filler particles were bonded together, the simple inorganic filler particles with lengths and widths that could be clearly determined were selected and used for calculation of the aspect ratio. Specifically, 10 particles whose lengths and widths could be clearly determined were selected, and the long axis length of each inorganic filler particle was divided by the short axis length and averaged to determine the aspect ratio. When a single visual field did not contain 10 particles whose lengths and widths could be clearly determined, 10 particles were selected from multiple visual field images.

Particle Size Distribution of Inorganic Filler

The particle size distribution of the inorganic filler was measured using a particle size measuring device ("Microtrac UPA150", product name of Nikkiso Co., Ltd.). Using the pre-coating dispersion as the sample solution for measurement, and with measuring conditions of loading index=0.20 and measuring time=300 seconds, the value of the standard deviation SD for the volume-average particle size in the obtained data was divided by the D50 value to calculate the particle size distribution (Cv value) of the inorganic filler.

Volume-Average Particle Size (D50) of Thermoplastic Polymer and Volume-Average Particle Size (D50) of Resin Binder in Aqueous Dispersion The volume-average particle size (D50) of the thermoplastic polymer and the volume-average particle size (D50) of the resin binder in the aqueous dispersion were measured using a particle size measuring device (product name: "Microtrac UPA150" by Nikkiso Co., Ltd.). The volume-average particle size (D50) was recorded as the value for the particle size (D50) at 50% cumulative volume, in data obtained under measuring conditions of loading index=0.20 and measuring time=300 seconds.

Particle Size Distribution of Polymer Particles

A cross-section of an osmium vapor deposited separator for a power storage device was measured by observation using a scanning electron microscope (SEM) (model "S-4800" by Hitachi) at 10,000× with an acceleration voltage of 1.0 kV. Specifically, the circle equivalent diameter was measured for 200 arbitrary polymer particles, determining the number-mean particle size MN and volume-average particle size MV from the values and calculating the particle size distribution of the polymer particles as MV/MN.

Rate Characteristic a. Fabrication of Positive Electrode

After mixing 90.4 parts by weight of a nickel, manganese and cobalt complex oxide (NMC) (Ni:Mn:Co=1:1:1 (element ratio), density: 4.70 $g/cm^3$), as the positive electrode active material, 1.6 parts by weight of graphite powder (KS6) (density: 2.26 $g/cm^3$, number-mean particle size: 6.5 μm) and 3.8 parts by weight of acetylene black powder (AB) (density: 1.95 $g/cm^3$, number-mean particle size: 48 nm), as conductive aids, and 4.2 parts by weight of polyvinylidene fluoride (PVDF) (density: 1.75 $g/cm^3$) as a binder, the mixture was dispersed in N-methylpyrrolidone (NMP) to prepare a slurry. The slurry was coated using a die coater onto one side of a 20 μm-thick aluminum foil sheet as the positive electrode collector, and dried at 130° C. for 3 minutes, after which it was compression molded using a roll press, to fabricate a positive electrode. The coating amount of the positive electrode active material was 109 g/m$^2$.

b. Fabrication of Negative Electrode

In purified water there were dispersed 87.6 parts by weight of graphite powder A (density: 2.23 g/cm$^3$, number-mean particle size: 12.7 μm) and 9.7 parts by weight of graphite powder B (density: 2.27 g/cm$^3$, number-mean particle size: 6.5 μm) as negative electrode active materials, and 1.4 (solid) parts by weight of carboxymethyl cellulose ammonium salt (1.83 parts by weight solid concentration aqueous solution) and 1.7 (solid) parts by weight of diene rubber latex (40 parts by weight solid concentration aqueous solution) as binders, to prepare a slurry. The slurry was coated using a die coater onto one side of a 12 μm-thick copper foil sheet as the negative electrode collector, and dried at 120° C. for 3 minutes, after which it was compression molded using a roll press to fabricate a negative electrode. The coating amount of the negative electrode active material was 5.2 g/m$^2$.

c. Preparation of Nonaqueous Electrolyte Solution

A nonaqueous electrolyte solution was prepared by dissolving 1.0 mol/L concentrated $LiPF_6$, as a solute, in a mixed solvent of ethylene carbonate:ethyl methyl carbonate=1:2 (volume ratio).

d. Battery Assembly

The separator or substrate was cut out to 24 mmφ, and the positive electrode and negative electrode were each cut out into a 16 mmφ circular form. The negative electrode, the separator or substrate and the positive electrode were stacked in that order with the active material sides of the positive electrode and negative electrode facing each other, and were then inserted into a covered stainless steel metal container. The container and cover were insulated, with the container in contact with the negative electrode copper foil and the cover in contact with the positive electrode aluminum foil. The nonaqueous electrolyte solution was injected into the container at 0.4 ml and sealed to assemble a battery.

e. Evaluation of Rate Characteristic

Each simple battery assembled in d. above was subjected to initial charging following battery fabrication, for a total of approximately 6 hours, by a method of charging to a cell voltage of 4.2 V at a current value of 3 mA (approximately 0.5C) at 25° C., and then beginning to draw out the current value from 3 mA while maintaining 4.2 V. The battery was then discharged to a cell voltage of 3.0 V at a current value of 3 mA. This was followed by charging for a total of approximately 3 hours, by a method of charging to a cell voltage of 4.2 V at a current value of 6 mA (approximately 1.0 C) at 25° C., and then beginning to draw out the current value from 6 mA while maintaining 4.2 V. The service capacity after discharge to a cell voltage of 3.0 V at a current value of 6 mA was recorded as the 1C service capacity (mAh). This was followed by charging for a total of approximately 3 hours, by a method of charging to a cell voltage of 4.2 V at a current value of 6 mA (approximately 1.0 C) at 25° C., and then beginning to draw out a current of 6 mA while maintaining 4.2 V. The service capacity after discharge to a cell voltage of 3.0 V at a current value of 12 mA (approximately 2.0 C) was recorded as the 2C service capacity (mAh). The ratio of the 2C service capacity with respect to the 1C service capacity was calculated and the value was recorded as the rate characteristic.

$$\text{Rate characteristic (\%)}=(2C\text{ service capacity}/1C\text{ service capacity})\times 100$$

Evaluation Scale for Rate Characteristic (%)

A (Good): Rate characteristic of >85%

B (Fair): Rate characteristic of >80% and ≤85%

C (Poor): Rate characteristic of ≤80%

Adhesive Force with Electrodes (Before Injection of Electrolyte Solution)

A separator was cut out to a rectangular form of 20 mm width×70 mm length and stacked with a positive electrode cut to a size of 15 mm×60 mm to form a separator/electrode laminated stack, which was then pressed under the following conditions.

Temperature: 90° C.

Press pressure: 1 MPa

Pressing time: 5 sec

The peel strength of the pressed separator and electrode was measured by using ZP5N and MX2-500N (trade names) force gauges by Imada Co., Ltd. for 900 peel testing at a peel rate of 50 mm/min. The average for the peel strength in the peel test for a 40 mm length, carried out under the conditions described above, was used as the peel strength.

Evaluation Scale for Adhesion

A: (Good): Peel strength of ≥5 N/m

B (Fair): Peel strength of ≥2 N/m and <5 N/m

C (Poor): Peel strength of ≥1 N/m and <2 N/m

D (Unacceptable): Peel strength of <1 N/m

Adhesive Force with Electrodes (after Injection of Electrolyte Solution)

A separator was cut out to a rectangular form of 20 mm width×70 mm length and stacked with a positive electrode cut to a size of 15 mm×60 mm to form a separator/electrode laminated stack, which was inserted into an aluminum laminate film, and then 0.4 ml of an electrolyte solution (EC/DEC=1/2 mixture containing 1 mol/L LiPF6) was added. The mixture was allowed to stand for 12 hours after sealing, and then pressed under the following conditions.

Temperature: 90° C.

Press pressure: 1 MPa

Pressing time: 1 minute

The peel strength of the pressed separator and electrode was measured by using ZP5N and MX2-500N (trade names) force gauges by Imada Co., Ltd. for 90° peel testing at a peel rate of 50 mm/min. The average for the peel strength in the peel test for a 40 mm length, carried out under the conditions described above, was used as the peel strength, for evaluation.

Evaluation Scale for Adhesion

A: (Good): Peel strength of ≥5 N/m

B (Fair): Peel strength of ≥2 N/m and <5 N/m

C (Poor): Peel strength of ≥1 N/m and <2 N/m

D (Unacceptable): Peel strength of <1 N/m

Powder Shedding

A 12 mm width×100 mm length piece of tape (3M Co.) was attached to the starting material polymer coating layer of the separator. The force required to peel the tape from the sample at a speed of 50 mm/min was measured using a 90° peel strength meter (product name: IP-5N by Imada). The adhesive force was evaluated based on the measurement results, using the following evaluation scale.

A (Good): ≥59 N/m (6 gf/mm)

B (Acceptable): ≥40 N/m and <59 N/m

C (Poor): <40 N/m

Cycle Characteristic a. Fabrication of Positive Electrode

After mixing 100 parts by weight of a nickel, cobalt and aluminum complex oxide (NCA) (Ni:Co:Al=90:5:5 (element ratio), density: 3.50 g/cm$^3$), as the positive electrode active material, 1.25 parts by weight of acetylene black powder (AB) as a conductive material, and 1.0 part by weight of polyvinylidene fluoride (PVdF) as a binder, the mixture was dispersed in N-methylpyrrolidone (NMP) to prepare a slurry. The slurry was coated using a die coater onto both sides of a 15 μm-thick aluminum foil sheet as the positive electrode collector, and dried at 130° C. for 3 minutes, after which it was compression molded using a roll press, to fabricate a positive electrode. The coating amount of the positive electrode active material was 456 $g/m^2$.

b. Fabrication of Negative Electrode

A slurry was prepared by dispersing 86.0 parts by weight of graphite powder and 4.5 parts by weight of silicon oxide (SiO) as negative electrode active materials, and 1 part by weight of a sodium salt of carboxymethyl cellulose and 1.0 part by weight of styrene-butadiene rubber (SBR) as binders, in purified water. The slurry was coated using a die coater onto both sides of a 7.5 μm-thick copper foil sheet as the negative electrode collector, and dried at 120° C. for 3 minutes, after which it was compression molded using a roll press to fabricate a negative electrode. The coating amount of the negative electrode active material was 266 $g/m^2$.

c. Preparation of Nonaqueous Electrolyte Solution

A nonaqueous electrolyte solution was prepared by dissolving 1.4 mol/L concentration $LiPF_6$, as a solute, in a mixed solvent of ethylene carbonate:dimethyl carbonate: ethyl methyl carbonate=25:70:5 (weight ratio).

d. Battery Assembly

The positive electrode (63 mm width), negative electrode (64 mm width) and separator (67 mm width) were laminated and wound into a helical form to prepare a wound body. The wound body was placed in a cylindrical battery can with an outer diameter of 21 mm and a height of 70 mm, the nonaqueous electrolyte solution was injected and the can was sealed to assemble a battery.

E. Evaluation of Cycle Characteristic

Each battery assembled in d. above was charged to a cell voltage of 4.2 V at a current value of 3 mA (approximately 0.5 C) at 25° C., and then charged to a current value of 50 mA while maintaining 4.2 V. It was then discharged to a cell voltage of 2.5 V at 0.2 C and the initial capacity was determined. After then charging to a cell voltage of 4.2 V at 0.3 C, it was charged to a current value of 50 mA while maintaining 4.2 V, and then discharged to a cell voltage of 2.5 V at 1 C. Charge-discharge was repeated with this procedure as 1 cycle. The capacity retention after 500 cycles with respect to the initial capacity (the capacity at the first cycle) was used to evaluate the cycle characteristic on the following scale.

A: Capacity retention of ≥80%.

B: Capacity retention of ≥75% and <80%.

C: Capacity retention of <75%.

Substrate Production Examples

Production of Polyolefin Microporous Membrane B1

High-density polyethylene homopolymer with a My of 700,000, at 45 parts by weight, high-density polyethylene homopolymer with a My of 300,000, at 45 parts by weight, and a mixture of polypropylene homopolymer with a My of 400,000 and polypropylene homopolymer with a My of 150,000 (weight ratio=4:3), at 10 parts by weight, were dry blended using a tumbler blender. To 99 parts by weight of the obtained polyolefin mixture there was added 1 part by weight of tetrakis-[methylene-(3',5'-di-t-butyl-4'-hydroxyphenyl)propionate]methane as an antioxidant, and a tumbler blender was again used for dry blending to obtain a mixture. The obtained mixture was supplied to a twin-screw extruder using a feeder, under a nitrogen atmosphere. Liquid paraffin (kinematic viscosity at 37.78° C.: $7.59\times10^{-5}$ $m^2/s$) was also injected into the extruder cylinder by a plunger pump. The operating conditions for the feeder and pump were adjusted for a liquid paraffin content of 65 parts by weight and a resin composition concentration of 35 parts by weight in the total of 100 parts by weight of the mixture to be extruded.

The contents were then melt kneaded in the twin-screw extruder while heating to 230° C., the obtained melt kneaded mixture was extruded through a T-die onto a cooling roll controlled to a surface temperature of 80° C., and the extruded mixture was contacted with a cooling roll for casting and cooled to solidification to obtain a cast sheet. The sheet was then stretched to a factor of 7×6.4 at 112° C. using a simultaneous biaxial stretcher, and the stretched sheet was immersed in methylene chloride for extraction removal of the liquid paraffin and then dried and stretched by a factor of 2 in the transverse direction using a tenter stretcher at a temperature of 130° C. The stretched sheet was then relaxed to approximately 10% in the transverse direction and subjected to heat treatment to obtain a polyolefin microporous membrane B1 as a substrate.

The physical properties of the obtained polyolefin microporous membrane B1 were measured and evaluated by the methods described above. The results are shown in Table 1.

Production of Polyolefin Microporous Membranes B2 to B4

Polyolefin microporous membrane B2 was produced in the same manner as polyolefin microporous membrane B1, except that the extrusion output of the resin composition and liquid paraffin and the temperature and relaxation factor during stretching were changed. Polyolefin microporous membrane B3 and polyolefin microporous membrane B4 were produced in the same manner as polyolefin microporous membrane B1, and the methylene chloride temperature during methylene chloride immersion was adjusted. Table 1 shows the results of measurement and evaluation in the same manner for polyolefin microporous membranes B2 to B4.

Polyolefin Microporous Membrane B5

As a polypropylene monolayer film prepared by a dry pore-forming method, the Celgard separator CG2500 (model name, product of Celgard) was used as polyolefin microporous membrane B5 and was measured and evaluated in the same manner as polyolefin microporous membrane B1. The results are shown in Table 1.

TABLE 1

| Substrate | | | | | |
|---|---|---|---|---|---|
| | Polyolefin microporous membrane No. | | | | |
| | B1 | B2 | B3 | B4 | B5 |
| Basis weight ($g/m^2$) | 3.5 | 6.4 | 6.4 | 6.4 | CELGARD "CG2500" |
| Thickness (μm) | 6 | 12 | 12 | 12 | |
| Porosity (%) | 37 | 44 | 44 | 44 | |
| Air permeability (sec/100 cc) | 140 | 150 | 155 | 145 | |
| Puncture strength (gf/20 μm) | 255 | 500 | 500 | 500 | |
| Mean pore size (μm) | 50 | 50 | 50 | 50 | |
| Methylene chloride-soluble portion (weight %) | 0.5 | 0.7 | 1.3 | 0.2 | |

Aqueous Dispersion Preparation Example

Preparation of Aqueous Dispersion A1

Into a reactor equipped with a stirrer, reflux condenser, drip tank and thermometer there were loaded 70.4 parts by weight of ion-exchanged water, 0.5 part by weight of "AQUALON KH1025" (registered trademark of Dai-ichi Kogyo Seiyaku Co., Ltd., 25% aqueous solution, listed as "KH1025" in the tables, same hereunder), and 0.5 part by weight of "ADEKA REASOAP SRI025" (registered trademark of Adeka Corp., 25% aqueous solution, listed as "SR1025" in the tables, same hereunder), and the internal temperature of the reactor was raised to 95° C. The internal temperature of the container was then kept at 95° C. while adding 7.5 parts by weight of ammonium persulfate (2% aqueous solution) (listed as "APS (aq)" in the tables, same hereunder).

Separately, a mixture of 71.5 parts by weight of methyl methacrylate (MMA), 18.9 parts by weight of n-butyl acrylate (BA), 2 parts by weight of 2-ethylhexyl acrylate (EHA), 0.1 part by weight of methacrylic acid (MAA), 0.1 part by weight of acrylic acid (AA), 2 parts by weight of 2-hydroxyethyl methacrylate (HEMA), 5 parts by weight of acrylamide (AM), 0.4 part by weight of glycidyl methacrylate (GMA), 0.4 part by weight of trimethylolpropane triacrylate (A-TMPT) (Shin-Nakamura Chemical Co., Ltd.), 0.3 part by weight of γ-methacryloxypropyltrimethoxysilane (AcSi), 3 parts by weight of KH1025, 3 parts by weight of SR1025, 0.05 part by weight of sodiump-styrenesulfonate (NaSS), 7.5 parts by weight of ammonium persulfate (2% aqueous solution) and 52 parts by weight of ion-exchanged water, was mixed for 5 minutes using a homomixer to prepare an emulsified liquid. The obtained emulsified liquid was added dropwise from a drip tank into the reactor. The dropwise addition was initiated 5 minutes after addition of the ammonium persulfate aqueous solution to the reactor, adding the total amount of the emulsified liquid dropwise over a period of 150 minutes. During dropwise addition of the emulsified liquid, the internal temperature of the container was kept at 80° C. The stirring bar in the reactor was constantly stirred with a magnetic stirrer.

Upon completion of the dropwise addition of the emulsified liquid, the internal temperature of the reactor was kept at 80° C. for a period of 90 minutes, after which the mixture was cooled to room temperature to obtain an emulsion. The obtained emulsion was adjusted to pH 9.0 using aqueous ammonium hydroxide (25% aqueous solution), to obtain an acrylic copolymer latex with a concentration of 40 parts by weight (aqueous dispersion A1). The obtained aqueous dispersion A1 was evaluated for glass transition temperature (Tg) of the thermoplastic polymer and volume-average particle size (D50), by the methods described above. The results are shown in Table 2.

Preparation of Aqueous Dispersions A2 to A4

Aqueous dispersions A2 to A4 were obtained in the same manner as aqueous dispersion A1 except for changing the composition of the emulsified liquid as shown in Table 2, and the physical properties were evaluated. The results are shown in Table 2.

Preparation of Aqueous Dispersion A2-1

A portion of aqueous dispersion A1 was used as a seed polymer for multistage polymerization to synthesize aqueous dispersion A2-1. Specifically, first a mixture of 20 parts by weight of aqueous dispersion A1 as solid content and 70.4 parts by weight of ion-exchanged water was loaded into a reactor equipped with a stirrer, reflux condenser, drip tank and thermometer, and the internal temperature of the reactor was increased to 80° C. The internal temperature of the container was then kept at 80° C. while adding 7.5 parts by weight of ammonium persulfate (2% aqueous solution). This was the initial charging.

Separately, a mixture of 71.5 parts by weight of methyl methacrylate (MMA), 18.9 parts by weight of n-butyl acrylate (BA), 2 parts by weight of 2-ethylhexyl acrylate (EHA), 0.1 part by weight of methacrylic acid (MAA), 0.1 part by weight of acrylic acid (AA), 2 parts by weight of 2-hydroxyethyl methacrylate (HEMA), 5 parts by weight of acrylamide (AM), 0.4 part by weight of glycidyl methacrylate (GMA), 0.7 part by weight of trimethylolpropane triacrylate (A-TMPT), 0.3 part by weight of γ-methacryloxypropyltrimethoxysilane (AcSi), 3 parts by weight of KH1025, 3 parts by weight of SR1025, 0.05 part by weight of sodiump-styrenesulfonate (NaSS), 7.5 parts by weight of ammonium persulfate (2% aqueous solution) and 52 parts by weight of ion-exchanged water, was mixed for 5 minutes using a homomixer to prepare an emulsified liquid. The obtained emulsified liquid was added dropwise from a drip tank into the reactor. The dropwise addition was initiated 5 minutes after addition of the ammonium persulfate aqueous solution to the reactor, adding the total amount of the emulsified liquid dropwise over a period of 150 minutes. During dropwise addition of the emulsified liquid, the internal temperature of the container was kept at 80° C. The stirring bar in the reactor was constantly stirred with a magnetic stirrer.

Upon completion of the dropwise addition of the emulsified liquid, the internal temperature of the reactor was kept at 80° C. for a period of 90 minutes while stirring, after which the mixture was cooled to room temperature to obtain an emulsion. The obtained emulsion was adjusted to pH 9.0 using aqueous ammonium hydroxide (25% aqueous solution), to obtain an acrylic copolymer latex with a concentration of 40 parts by weight (aqueous dispersion A2-1). The obtained aqueous dispersion A2-1 was evaluated by the methods described above. The results are shown in Table 2.

Preparation of Aqueous Dispersions A1-2 to A1-4

Copolymer latexes (aqueous dispersions A1-2 to A1-4) were obtained by adjusting the number of multistage polymerizations. Each obtained aqueous dispersion was evaluated by the methods described above. The results are shown in Table 2.

Preparation of Aqueous Dispersions A2-1, A3-1 to A3-4 and A4-1

Copolymer latexes (aqueous dispersions A2-1, A3-1 to A3-4 and A4-1) were obtained in the same manner as aqueous dispersion A1-1, except for changing the compositions of the seed polymer, monomers and other starting materials, the number of multistage polymerizations, and the polymerization conditions, as shown in Table 2. Each obtained aqueous dispersion was evaluated by the methods described above. The results are shown in Table 2.

Preparation of Aqueous Dispersions A5 and A6

SB latex (Tg: 33° C., particle size: 300 nm, toluene insolubles: 95%, swelling degree: 1.4×) was used as aqueous dispersion A5. PVdF-HFP (product name: LBG, by Arkema) having a primary particle size of 200 nm and with primary particles aggregated to form 2030 nm secondary particles, was used as aqueous dispersion A6.

TABLE 2

Aqueous dispersion

| | Type | Starting material | Active ingredient % or unit | Aqueous dispersion A1 | A2 | A3 | A4 | A1-1 | A1-2 | A1-3 | A1-4 |
|---|---|---|---|---|---|---|---|---|---|---|---|
| Initial charging | Seed polymer type | | — | — | — | — | — | A1 | A1 | A1 | A1 |
| | Seed polymer diameter | | (nm) | — | — | — | — | 132 | 132 | 132 | 132 |
| | Seed polymer amount | | 100% | — | — | — | — | 20% | 20% | 20% | 20% |
| | Emulsifier | KH1025 | 25% | 0.5 | 0.5 | 0.5 | 0.5 | — | — | — | — |
| | | SR1025 | 25% | 0.5 | 0.5 | 0.5 | 0.5 | — | — | — | — |
| | Ion-exchanged water | | — | 70.4 | 70.4 | 70.4 | 70.4 | 70.4 | 70.4 | 70.4 | 70.4 |
| | Initiator | APS (aq) | 2% | 7.5 | 7.5 | 7.5 | 7.5 | 7.5 | 7.5 | 7.5 | 7.5 |
| Emulsified liquid | Acid monomer | MAA | 100% | 0.1 | 1.0 | 1.0 | 0.1 | 0.1 | 0.1 | 0.1 | 0.1 |
| | | AA | 100% | 0.1 | 1.0 | 1.0 | 0.1 | 0.1 | 0.1 | 0.1 | 0.1 |
| | (Meth)acrylic acid ester | MMA | 100% | 71.5 | 51.0 | 20.0 | 71.5 | 71.5 | 71.5 | 71.5 | 71.5 |
| | | BA | 100% | 18.9 | 37.0 | 0 | 18.9 | 18.9 | 18.9 | 18.9 | 18.9 |
| | | BMA | 100% | 0 | 0 | 0 | 0 | 0 | 0 | 0 | 0 |
| | | EHA | 100% | 2 | 0 | 0 | 2 | 2 | 2 | 2 | 2 |
| | | CHMA | 100% | 0 | 0 | 0 | 0 | 0 | 0 | 0 | 0 |
| | Aromatic vinyl monomer | St | 100% | 0 | 0 | 78 | 0 | 0 | 0 | 0 | 0 |
| | Cyano group-containing monomer | AN | 100% | 0 | 10 | 0 | 0 | 0 | 0 | 0 | 0 |
| | Functional group-containing monomer | HEMA | 100% | 2 | 0 | 0 | 2 | 2 | 2 | 2 | 2 |
| | | AM | 100% | 5 | 0 | 0 | 5 | 5 | 5 | 5 | 5 |
| | Crosslinkable monomer | GMA | 100% | 0.4 | 0 | 0 | 0 | 0.4 | 0.4 | 0.4 | 0.4 |
| | | A-TMPT | 100% | 0.4 | 1.0 | 1.0 | 0 | 0.4 | 0.4 | 0.4 | 0.4 |
| | | AcSi | 100% | 0.3 | 0.5 | 0.5 | 0 | 0.3 | 0.3 | 0.3 | 0.3 |
| | Emulsifier | KH1025 | 25% | 3.0 | 2.0 | 2.0 | 3.0 | 3.0 | 3.0 | 3.0 | 3.0 |
| | | SR1025 | 25% | 3.0 | 0 | 0 | 3.0 | 3.0 | 3.0 | 3.0 | 3.0 |
| | | NaSS | 100% | 0.1 | 0 | 0 | 0.1 | 0.1 | 0.1 | 0.1 | 0.1 |
| | Initiator | APS (aq) | 2% | 7.5 | 7.5 | 7.5 | 7.5 | 7.5 | 7.5 | 7.5 | 7.5 |
| | Ion-exchanged water | | — | 52 | 52 | 52 | 52 | 52 | 52 | 52 | 52 |
| Physical properties | Glass transition temperature (Tg) | | (° C.) | 55 | 24.8 | 95 | 55 | 55 | 55 | 55 | 55 |
| | Volume-average particle diameter (D50) | | (nm) | 132 | 122 | 131 | 125 | 700 | 1220 | 4220 | 9530 |
| | Particle size distribution | | — | 1.10 | 1.13 | 1.12 | 1.08 | 1.08 | 1.09 | 1.15 | 1.30 |
| Polymer form after covering layer formation | | | | Particulate | Coated film | Particulate | Particulate | Particulate | Particulate | Particulate | Particulate |
| Polymer particle size after covering layer formation | | | | — | — | — | — | 710 | 1250 | 4230 | 9550 |

| | Type | Starting material | Active ingredient % or unit | Aqueous dispersion A2-1 | A3-1 | A3-2 | A3-3 | A3-4 | A4-1 | A5 | A6 |
|---|---|---|---|---|---|---|---|---|---|---|---|
| Initial charging | Seed polymer type | | — | A2 | A3 | A3 | A3 | A3 | A4 | SB Latex | PVdF-HFP |
| | Seed polymer diameter | | (nm) | 122 | 131 | 131 | 131 | 131 | 125 | | |
| | Seed polymer amount | | 100% | 20% | 20% | 20% | 20% | 20% | 20% | | |
| | Emulsifier | KH1025 | 25% | — | — | — | — | — | — | | |
| | | SR1025 | 25% | — | — | — | — | — | — | | |
| | Ion-exchanged water | | — | 70.4 | 70.4 | 70.4 | 70.4 | 70.4 | 70.4 | | |
| | Initiator | APS (aq) | 2% | 7.5 | 7.5 | 7.5 | 7.5 | 7.5 | 7.5 | | |
| Emulsified liquid | Acid monomer | MAA | 100% | 1.0 | 1.0 | 1.0 | 1.0 | 1.0 | 0.1 | | |
| | | AA | 100% | 1.0 | 1.0 | 1.0 | 1.0 | 1.0 | 0.1 | | |
| | (Meth)acrylic acid ester | MMA | 100% | 51.0 | 20.0 | 20.0 | 20.0 | 20.0 | 71.5 | | |
| | | BA | 100% | 37.0 | 0 | 0 | 0 | 0 | 18.9 | | |
| | | BMA | 100% | 0 | 0 | 0 | 0 | 0 | 0 | | |
| | | EHA | 100% | 0 | 0 | 0 | 0 | 0 | 2 | | |
| | | CHMA | 100% | 0 | 0 | 0 | 0 | 0 | 0 | | |
| | Aromatic vinyl monomer | St | 100% | 0 | 78 | 78 | 78 | 78 | 0 | | |
| | Cyano group-containing monomer | AN | 100% | 10 | 0 | 0 | 0 | 0 | 0 | | |
| | Functional group-containing monomer | HEMA | 100% | 0 | 0 | 0 | 0 | 0 | 2 | | |
| | | AM | 100% | 0 | 0 | 0 | 0 | 0 | 5 | | |
| | Crosslinkable monomer | GMA | 100% | 0 | 0 | 0 | 0 | 0 | 0 | | |
| | | A-TMPT | 100% | 1.0 | 1.0 | 1.0 | 1.0 | 1.0 | 0 | | |
| | | AcSi | 100% | 0.5 | 0.5 | 0.5 | 0.5 | 0.5 | 0 | | |
| | Emulsifier | KH1025 | 25% | 2.0 | 2.0 | 2.0 | 2.0 | 2.0 | 3.0 | | |
| | | SR1025 | 25% | 0 | 0 | 0 | 0 | 0 | 3.0 | | |
| | | NaSS | 100% | 0 | 0 | 0 | 0 | 0 | 0.1 | | |
| | Initiator | APS (aq) | 2% | 7.5 | 7.5 | 7.5 | 7.5 | 7.5 | 7.5 | | |
| | Ion-exchanged water | | — | 52 | 52 | 52 | 52 | 52 | 52 | | |

TABLE 2-continued

| | | | Aqueous dispersion | | | | | | | |
|---|---|---|---|---|---|---|---|---|---|---|
| Physical properties | Glass transition temperature (Tg) | (° C.) | 24.8 | 95 | 95 | 95 | 95 | 55 | | |
| | Volume-average particle diameter (D50) | (nm) | 1350 | 2020 | 3500 | 5570 | 9960 | 700 | | |
| | Particle size distribution | — | 1.06 | 1.08 | 1.04 | 1.04 | 1.35 | 1.55 | 1.66 | — |
| Polymer form after covering layer formation | | | Coated film | Particulate | Particulate | Particulate | Particulate | Particulate | Particulate | Particulate |
| Polymer particle size after covering layer formation | | | 1360 | 2020 | 3500 | 5570 | 9960 | 710 | 2030 | 200/2030 |

A6: 200 nm primary particle size, 2030 nm secondary particle size
Emulsifiers
KH1025: AQUALON KH1025, trade name of Dai-ichi Kogyo Seiyaku Co., Ltd., 25% aqueous solution.
SR1025: ADEKA REASOAP SR1025, trade name of Adeka Corp., 25% aqueous solution.
NaSS: Sodium p-styrenesulfonate
Initiator
APS (aq): Ammonium persulfate (2% aqueous solution)
Monomers
MAA: Methacrylic acid
AA: Acrylic acid
MMA: Methyl methacrylate
BA: n-Butyl acrylate
BMA: n-Butyl methacrylate
EHA: 2-Ethylhexyl acrylate
CHMA: Cyclohexyl methacrylate
St: Styrene
AN: Acrylonitrile
HEMA: 2-Hydroxyethyl methacrylate
AM: Acrylamide
GMA: Glycidyl methacrylate
A-TMPT: Trimethylolpropane triacrylate
AcSi: γ-Methacryloxypropyltrimethoxysilane

SEPARATOR PRODUCTION EXAMPLE

Example 1

After mixing 0.3 part by weight of an ammonium polycarboxylate aqueous solution (SN Dispersant 5468 by San Nopco, Ltd.) and 100 parts by weight of aluminum oxide hydroxide (boehmite) as an inorganic filler with respect to 100 parts by weight of water, the mixture was processed with a bead mill to obtain a pre-coating dispersion. In the pre-coating dispersion there was mixed 1 part by weight of carboxymethyl cellulose (CMC) as a water-soluble polymer component with respect to 100 parts by weight of the inorganic filler, after which 4 parts by weight (solid content) of an acrylic latex suspension (40% solid concentration, volume-average particle size: 150 nm) and 20 parts by weight of aqueous dispersion A1-2 were further mixed as resin binders, forming a uniform dispersion to prepare a coating solution containing a thermoplastic polymer (40 parts by weight as solid content).

Both sides of polyolefin microporous membrane B1 were surface-treated by corona discharge treatment. A gravure coater was then used to coat one side (side (A)) of polyolefin microporous membrane B1 with the coating solution. The shear rate with the gravure coater was 80,000 $sec^{-1}$. The area coverage ratio of the covering layer with respect to the polyolefin microporous membrane was 100%. The coating solution that had been applied at 60° C. was then dried to remove the water. The coating solution was also applied onto the side of the polyolefin microporous membrane B1 opposite from side (A) (side (B)) and dried in the same manner as described above. A separator was thus obtained having a covering layer formed on both sides of the polyolefin microporous membrane B1.

Examples 2 to 20

A separator was obtained in the same manner as Example 1, except that the polyolefin microporous membrane, the coating solution composition and the coating conditions were changed as listed in Tables 3 and 4.

Comparative Examples 1 to 9

Separators for Comparative Examples 1 to 9 were obtained in the same manner as Example 1, except that the polyolefin microporous membrane, the coating solution composition and the coating conditions were changed as listed in Table 5. In the separator of Comparative Example 6, the polymer particles were dispersed in the form of secondary particles. The alumina used in Comparative Example 9 was "AKP3000" by Sumitomo Chemical Co., Ltd.

The separators of Examples 16, 19 and 20 and Comparative Examples 1 and 3 were each evaluated for cycle characteristic, and their results are shown in Table 6. For Comparative Example 3, distortion was produced between the electrodes and wound separator following the cycle characteristic test.

TABLE 3

| | | Separator | | | | | | | | | |
|---|---|---|---|---|---|---|---|---|---|---|---|
| | | Ex. 1 | Ex. 2 | Ex. 3 | Ex. 4 | Ex. 5 | Ex. 6 | Ex. 7 | Ex. 8 | Ex. 9 | Ex. 10 |
| Substrate | | B1 | B1 | B2 | B2 | B1 | B1 | B1 | B1 | B1 | B3 |
| | Inorganic filler (parts by weight) | 100 | 100 | 100 | 100 | 100 | 100 | 100 | 100 | 100 | 100 |
| | Polymer particles (parts by weight | 20 | 20 | 7 | 7 | 20 | 20 | 20 | 20 | 50 | 20 |
| | Resin binder (parts by weight) | 4 | 4 | 4 | 4 | 4 | 4 | 4 | 4 | 4 | 4 |
| | Water-soluble polymer component (parts by weight) | 1 | 1 | 1 | 1 | 1 | 1 | 1 | 1 | 1 | 1 |
| Inorganic component | Type | Boehm-ite | Boehm-ite | Boehm-ite | Boehm-ite | Boehm-ite | Boehm-ite | Boehm-ite | Boehm-ite | Boehm-ite | Boehm-ite |
| | Mean particle size (nm) | 100 | 200 | 200 | 700 | 100 | 100 | 100 | 100 | 100 | 200 |
| | Form | Block | Block | Block | Block | Block | Block | Block | Block | Block | Block |
| | Aspect ratio | 1.7 | 1.7 | 1.7 | 1.8 | 1.7 | 1.7 | 1.7 | 1.7 | 1.7 | 1.7 |
| | Particle size distribution CV | 0.5 | 0.5 | 0.5 | 0.5 | 0.5 | 0.5 | 0.5 | 0.5 | 0.5 | 0.50 |
| Aqueous dispersion component | Type | A1-2 | A1-2 | A1-3 | A1-4 | A2 | A3-1 | A5 | A1-2 | A1-2 | A1-2 |
| | Mean particle size (nm) | 1250 | 1250 | 4230 | 9550 | 1360 | 2020 | 2030 | 1250 | 1250 | 1250 |
| Resin binder | Volume-average particle diameter (D50) (nm) | 150 | 150 | 150 | 150 | 150 | 150 | 150 | 150 | 150 | 150 |
| Water-soluble polymer component | Type | CMC | CMC | CMC | CMC | CMC | CMC | CMC | CMC | CMC | CMC |
| Thickness of covering layer inorganic filler portion (μm) | | 0.8 | 1.0 | 2.0 | 2.0 | 0.8 | 0.8 | 0.8 | 0.8 | 1.0 | 1.0 |
| Degree of polymer particle protrusion (μm) | | 0.4 | 0.2 | 2.2 | 7.6 | 0.6 | 1.2 | 1.2 | 0.4 | 0.2 | 0.2 |
| Polymer particle size (μm)/covering layer thickness (μm) | | 1.6 | 1.3 | 2.1 | 4.8 | 1.7 | 2.5 | 2.5 | 1.6 | 1.3 | 1.3 |
| Total separator thickness (μm) | | 8.5 | 8.5 | 20.5 | 31.1 | 8.7 | 10.0 | 10.1 | 8.4 | 8.4 | 8.4 |
| Protruding polymer particle size/inorganic filler particle size | | 12.5 | 6.3 | 21.2 | 13.6 | 13.6 | 20.2 | 20.3 | 12.5 | 12.5 | 11.0 |
| Average number of adjacent polymer particles | | 1 | 1 | 0 | 0 | 1 | 1 | 1 | 3 | 1 | 1 |
| Average number polymer particles within 10 μm radius | | 37 | 37 | 1 | 0 | 39 | 53 | 55 | 35 | 88 | 37 |
| Methylene chloride-soluble portion (%) | | 0.3 | 0.3 | 0.4 | 0.4 | 0.3 | 0.3 | 0.3 | 0.3 | 0.3 | 0.7 |
| Metal cation (ppm) | | 40 | 40 | 40 | 40 | 40 | 40 | 40 | 110 | 40 | 40 |
| 180° Peel strength (N/m) | | 300 | 300 | 300 | 280 | 300 | 300 | 300 | 220 | 210 | 350 |
| Covering layer slope L2/L1 | | 1.25 | 1.10 | 1.60 | 2.50 | 1.31 | 1.75 | 1.75 | 1.25 | 1.10 | 1.10 |
| Protruding section coverage factor (L2 − L1)/(L3 − L1) | | 0.44 | 0.40 | 0.54 | 0.40 | 0.45 | 0.49 | 0.49 | 0.44 | 0.40 | 0.40 |
| Contact ratio between polymer particles and substrate (%) | | 55 | 50 | 70 | 40 | 50 | 60 | 55 | 50 | 45 | 50 |
| 130° C. Heat shrinkage TD (%) | | 3.0 | 3.0 | <1.0 | <1.0 | 3.0 | 3.0 | 3.0 | 5.5 | 8.0 | 3.0 |
| 130° C. Heat shrinkage MD (%) | | 4.0 | 4.0 | <1.0 | <1.0 | 4.0 | 4.0 | 4.0 | 7.0 | 11.0 | 4.0 |
| 150° C. Heat shrinkage TD (%) | | 50.0< | 50.0< | <1.0 | <1.0 | 50.0< | 50.0< | 50.0< | 50.0< | 50.0< | 50.0< |
| 150° C. Heat shrinkage MD (%) | | 50.0< | 50.0< | <1.0 | <1.0 | 50.0< | 50.0< | 50.0< | 50.0< | 50.0< | 50.0< |
| Adhesive force with electrodes, before electrolyte solution injection | | A | A | B | B | A | B | B | B | A | A |
| Adhesive force with electrodes, after electrolyte solution injection | | A | A | B | B | A | A | B | B | A | A |
| Rate characteristic | | A | A | A | A | B | A | A | B | B | B |
| Powder shedding | | A | A | A | B | A | A | A | B | A | A |

TABLE 4

| | | Separator | | | | | | | | | |
|---|---|---|---|---|---|---|---|---|---|---|---|
| | | Ex. 11 | Ex. 12 | Ex. 13 | Ex. 14 | Ex. 15 | Ex. 16 | Ex. 17 | Ex. 18 | Ex. 19 | Ex. 20 |
| Substrate | | B4 | B1 | B1 | B1 | B5 | B2 | B2 | B2 | B2 | B2 |
| Weight ratio of components | Inorganic filler (parts by weight) | 100 | 100 | 100 | 100 | 100 | 100 | 100 | 100 | 100 | 100 |
| | Polymer particles (parts by weight) | 20 | 20 | 20 | 20 | 22 | 7 | 7 | 7 | 7 | 7 |
| | Resin binder (parts by weight) | 4 | 4 | 4 | 4 | 4 | 4 | 4 | 4 | 4 | 4 |
| | Water-soluble polymer component (parts by weight) | 1 | 1 | 2 | Absent | 1 | 0.5 | 0.5 | 0.5 | 0.5 | 0.5 |
| Inorganic component | Type | Boehm-ite | Boehm-ite | Boehm-ite | Boehm-ite | Boehm-ite | Boehm-ite | Boehm-ite | Barium sulfate | Boehm-ite | Boehm-ite |
| | Mean particle size (nm) | 200 | 100 | 200 | 200 | 200 | 450 | 450 | 400 | 450 | 450 |
| | Form | Block | Block | Block | Block | Block | Block | Block | Granular | Block | Block |
| | Aspect ratio | 1.7 | 1.7 | 1.7 | 1.7 | 1.7 | 1.8 | 1.8 | 1.4 | 1.8 | 1.8 |
| | Particle size distribution CV | 0.50 | 0.50 | 0.50 | 0.50 | 0.50 | 0.45 | 0.45 | 0.50 | 0.45 | 0.45 |

TABLE 4-continued

| | | Separator | | | | | | | | | |
|---|---|---|---|---|---|---|---|---|---|---|---|
| | | Ex. 11 | Ex. 12 | Ex. 13 | Ex. 14 | Ex. 15 | Ex. 16 | Ex. 17 | Ex. 18 | Ex. 19 | Ex. 20 |
| Aqueous dispersion component | Type | A1-2 | A1-2 | A1-2 | A1-2 | A1-2 | A3-2 | A3-2 | A3-2 | A3-3 | A3-4 |
| | Mean particle size (nm) | 1250 | 1250 | 1250 | 1250 | 1250 | 3500 | 3500 | 3500 | 5570 | 9960 |
| Resin binder | Volume-average particle diameter (D50) (nm) | 150 | 150 | 150 | 150 | 150 | 150 | 150 | 150 | 150 | 150 |
| Water-soluble polymer component | Type | CMC | CMC | CMC | CMC | CMC | CMC | Poly-acryl-amide | CMC | CMC | CMC |
| Thickness of covering layer inorganic filler portion (μm) | | 1.0 | 0.8 | 1.0 | 1.0 | 1.0 | 2.5 | 2.5 | 2.5 | 2.5 | 2.5 |
| Degree of polymer particle protrusion (μm) | | 0.2 | 0.4 | 0.2 | 0.2 | 0.2 | 1.0 | 1.0 | 1.0 | 3.1 | 7.5 |
| Polymer particle size (μm)/covering layer thickness (μm) | | 1.3 | 1.6 | 1.3 | 1.3 | 1.3 | 1.4 | 1.4 | 1.4 | 2.2 | 4.0 |
| Total separator thickness (μm) | | 8.4 | 8.4 | 8.4 | 8.4 | 27.5 | 15.5 | 15.5 | 15.5 | 17.6 | 22.0 |
| Protruding polymer particle size/inorganic filler particle size | | 11.0 | 12.5 | 11.0 | 11.0 | 11.0 | 7.8 | 7.8 | 8.8 | 12.4 | 22.1 |
| Average number of adjacent polymer particles | | 1 | 2 | 1 | 2 | 1 | 0 | 0 | 0 | 0 | 0 |
| Average number polymer particles within 10 μm radius | | 37 | 37 | 37 | 37 | 37 | 1 | 1 | 1 | 1 | 1 |
| Methylene chloride-soluble portion (%) | | 0.1 | 0.3 | 0.3 | 0.3 | 0.0 | 0.4 | 0.4 | 0.4 | 0.4 | 0.4 |
| Metal cation (ppm) | | 40 | 70 | 40 | 40 | 40 | 40 | 40 | 40 | 40 | 40 |
| 180° Peel strength (N/m) | | 220 | 260 | 300 | 230 | 200 | 280 | 330 | 350 | 280 | 280 |
| Covering layer slope L2/L1 | | 1.10 | 1.25 | 1.10 | 1.10 | 1.10 | 1.20 | 1.20 | 1.20 | 1.60 | 2.28 |
| Protruding section coverage factor (L2 − L1)/(L3 − L1) | | 0.40 | 0.44 | 0.40 | 0.40 | 0.40 | 0.50 | 0.50 | 0.50 | 0.48 | 0.43 |
| Contact ratio between polymer particles and substrate (%) | | 50 | 55 | 20 | 75 | 50 | 65 | 55 | 45 | 70 | 85 |
| 130° C. Heat shrinkage TD (%) | | 5.0 | 4.5 | 3.0 | 5.5 | 0.0 | <1.0 | <1.0 | <1.0 | <1.0 | <1.0 |
| 130° C. Heat shrinkage MD (%) | | 6.5 | 5.5 | 4.0 | 7.0 | 4.0 | <1.0 | <1.0 | <1.0 | <1.0 | <1.0 |
| 150° C. Heat shrinkage TD (%) | | 50.0< | 50.0< | 50.0< | 50.0< | 50.0< | <1.0 | <1.0 | <1.0 | <1.0 | <1.0 |
| 150° C. Heat shrinkage MD (%) | | 50.0< | 50.0< | 50.0< | 50.0< | 50.0< | <1.0 | <1.0 | <1.0 | <1.0 | <1.0 |
| Adhesive force with electrodes, before electrolyte solution injection | | B | B | A | B | B | B | B | B | B | B |
| Adhesive force with electrodes, after electrolyte solution injection | | A | B | A | B | A | B | B | B | B | B |
| Rate characteristic | | A | A | A | A | B | A | A | A | A | A |
| Powder shedding | | B | A | A | A | B | A | A | A | A | B |

TABLE 5

| | | Separator | | | | | | | | |
|---|---|---|---|---|---|---|---|---|---|---|
| | | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 |
| Substrate | | B2 | B2 | B2 | B1 | B1 | B1 | B2 | B2 | B2 |
| Weight ratio of components | Inorganic filler (parts by weight) | 100 | 100 | 100 | 100 | 100 | 100 | 100 | 100 | 100 |
| | Polymer particles (parts by weight) | 20 | 20 | 20 | 0 | 20 | 20 | 10 | 10 | 10 |
| | Resin binder (parts by weight) | 4 | 4 | 4 | 4 | 4 | 4 | 4 | 4 | 4 |
| | Water-soluble polymer component (parts by weight) | 1 | 1 | 1 | 1 | 1 | 1 | 1 | 1 | 1.5 |
| Inorganic component | Type | Boehm-ite | Boehm-ite | Boehm-ite | Boehm-ite | Boehm-ite | Boehm-ite | Alumina | Alumina | Alumina |
| | Mean particle size (nm) | 200 | 200 | 200 | 200 | 200 | 200 | 500 | 500 | 500 |
| | Form | Laminar | Laminar | Laminar | Laminar | Laminar | Laminar | Spherical | Spherical | Spherical |
| | Aspect ratio | 2.5 | 2.5 | 2.5 | 2.5 | 2.5 | 2.5 | 1.3 | 1.3 | 1.3 |
| | Particle size distribution CV | 0.50 | 0.50 | 0.50 | 0.50 | 0.50 | 0.50 | 0.89 | 0.89 | 0.89 |
| Aqueous dispersion component | Type | A1-1 | A1-1 | A1-1 | — | A4-1 | A6 | A1-3 | A1-3 | A3-2 |
| | Mean particle size (nm) | 710 | 710 | 710 | — | 710 | 200 | 4230 | 4230 | 3500 |
| Resin binder | Volume-average particle diameter (D50) (nm) | 150 | 150 | 150 | 150 | 150 | 150 | 40 | 150 | 150 |
| Water-soluble polymer component | Type | CMC | CMC | CMC | CMC | CMC | CMC | CMC | CMC | CMC |
| Thickness of covering layer inorganic filler portion (μm) | | 1.5 | 1.0 | 1.0 | 1.0 | 0.8 | 0.8 | 2.0 | 2.0 | 2.0 |
| Degree of polymer particle protrusion (μm) | | 0.3 | 0.3 | 0.0 | 0.0 | 0.4 | 0.4 | 2.2 | 2.2 | 1.5 |
| Polymer particle size (μm)/covering layer thickness (μm) | | 0.5 | 0.7 | 0.7 | — | 0.9 | 0.3 | 2.1 | 2.1 | 1.8 |
| Total separator thickness (μm) | | 9.6 | 8.6 | 8.0 | 8.0 | 7.4 | 6.4 | 20.5 | 20.5 | 15.5 |
| Protruding polymer particle size/inorganic filler particle size | | 3.6 | 3.6 | — | — | 3.6 | 1.0 | 8.5 | 8.5 | 7.0 |
| Average number of adjacent polymer particles | | 3 | 3 | 0 | 0 | 3 | 7 | 4 | 4 | 3 |
| Average number polymer particles within 10 μm radius | | 281 | 254 | 53 | 0 | 37 | >500 | 7 | 7 | 7 |

TABLE 5-continued

| | Separator | | | | | | | | |
|---|---|---|---|---|---|---|---|---|---|
| | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 |
| Methylene chloride-soluble portion (%) | 0.3 | 0.3 | 0.3 | 0.3 | 0.3 | 0.3 | 0.4 | 0.4 | 0.4 |
| Metal cation (ppm) | 40 | 40 | 40 | 40 | 40 | 40 | 40 | 40 | 40 |
| 180° Peel strength (N/m) | 130 | 120 | 300 | 300 | 190 | 140 | 70 | 130 | 150 |
| Covering layer slope L2/L1 | 1.00 | 1.00 | — | — | 1.00 | 1.00 | 1.05 | 1.05 | 1.05 |
| Protruding section coverage factor (L2 − L1)/(L3 − L1) | 0.00 | 0.00 | — | — | 0.00 | 0.00 | 0.04 | 0.04 | 0.07 |
| Contact ratio between polymer particles and substrate (%) | 5 | 15 | 10 | 0 | 5 | <0.01 | 15 | 15 | 5 |
| 130° C. Heat shrinkage TD (%) | 10.5 | 12.0 | 3.0 | 1.5 | 3.0 | 11.0 | 20.0 | 10.5 | 5.5 |
| 130° C. Heat shrinkage MD (%) | 13.0 | 14.5 | 4.0 | 2.0 | 4.0 | 13.5 | 22.0 | 13.0 | 6.2 |
| 150° C. Heat shrinkage TD (%) | 50.0< | 50.0< | 50.0< | 19.0 | 50.0< | 50.0< | 50.0< | 50.0< | 50.0< |
| 150° C. Heat shrinkage MD (%) | 50.0< | 50.0< | 50.0< | 20.3 | 50.0< | 50.0< | 50.0< | 50.0< | 50.0< |
| Adhesive force with electrodes, before electrolyte solution injection | C | C | C | D | A | C | B | C | C |
| Adhesive force with electrodes, after electrolyte solution injection | C | C | C | D | D | C | B | C | C |
| Rate characteristic | A | A | A | A | C | A | A | A | B |
| Powder shedding | C | C | A | A | A | B | C | C | C |

TABLE 6

| | Example 16 | Example 19 | Example 20 | Comp. Example 1 | Comp. Example 3 |
|---|---|---|---|---|---|
| Degree of polymer particle protrusion (μm) | 1.0 | 3.1 | 7.5 | 0.3 | 0.0 |
| Degree of polymer particle protrusion (μm)/thickness of the inorganic filler portion of the covering layer (μm) | 0.4 | 1.2 | 3.0 | 0.2 | 0.0 |
| Cycle characteristic | A | A | A | B | C |

INDUSTRIAL APPLICABILITY

The separator for a power storage device of the present disclosure can be suitably used for various types of power storage devices, and preferably for a lithium ion secondary battery.

REFERENCE SIGNS LIST

1 Inorganic filler
2 Polymer particles
10 Substrate
20 Covering layer

The invention claimed is:

1. A separator for a power storage device that comprises a substrate which is a polyolefin microporous membrane including a polyolefin as a main component, and a covering layer disposed on at least one surface of the substrate, wherein:

the covering layer comprises an inorganic filler and polymer particles of a thermoplastic polymer, the amount of polymer particles in the covering layer is 1 part by weight to 50 parts by weight with respect to 100 parts by weight of the inorganic filler in the covering layer, primary particles of the polymer particles have a mean particle size of from 1 μm to 10 μm, the polymer particles include polymer particles protruding from the covering layer, to at least 0.1 times the thickness of the inorganic filler portion of the covering layer, and the separator satisfies at least one of the following features (i) to (v):

(i) the covering layer is formed in an inclined manner so as to be thicker toward the protruding polymer particles;

(ii) at least 20% of the protruding polymer particles contact with the surface of the substrate;

(iii) the covering layer has 180° peel strength from the substrate of 200 gf/cm or greater;

(iv) the average number of protruding polymer particles adjacent to any one protruding polymer particle is less than 2;

(v) the ratio of the mean particle size of the protruding polymer particles with respect to the mean particle size of the inorganic filler is greater than 10.

2. The separator for a power storage device according to claim 1, wherein the separator satisfies the feature (i), and the average value for the slope L2/L1 of the covering layer is 1.2 or greater, where L1 is the thickness of the inorganic filler portion of the covering layer, and L2 is the maximum distance from the substrate-covering layer boundary to the outer surface of the inorganic filler of the covering layer formed in the inclined manner.

3. The separator for a power storage device according to claim 1, wherein the separator satisfies the feature (i), and the average value for the coverage factor (L2−L1)/(L3−L1) of the protruding section of the protruding polymer particles is 0.4 or greater, where L1 is the thickness of the inorganic filler portion of the covering layer, L2 is the maximum distance from the substrate-covering layer boundary to the outer surface of the inorganic filler of the covering layer formed in the inclined manner, and L3 is the maximum distance from the substrate-covering layer boundary to the outlines of the protruding polymer particles.

4. The separator for a power storage device according to claim 1, wherein the number of protruding polymer particles is at least 50% of the total number of polymer particles in the covering layer.

5. The separator for a power storage device according to claim 1, wherein the number of other protruding polymer particles present within a radius of 10 μm from any one protruding polymer particle is less than 60.

6. The separator for a power storage device according to claim 1, wherein the separator for a power storage device has a methylene chloride-soluble portion of from 0.05 parts by weight to 0.80 parts by weight with respect to the total weight of the separator for a power storage device.

7. The separator for a power storage device according to claim 1, wherein the total amount of metal cations in the covering layer is 0.1 ppm to 100 ppm, based on the total weight of the covering layer.

8. The separator for a power storage device according to claim 1, wherein the covering layer includes a water-soluble polymer.

9. The separator for a power storage device according to claim 8, wherein the amount of water-soluble polymer is 0.04 parts by weight or greater and less than 2 parts by weight with respect to 100 parts by weight of the inorganic filler.

10. The separator for a power storage device according to claim 1, wherein either one of the covering layer disposed on at least one side of the substrate has a thickness of 0.3 μm to 1.3 μm.

11. The separator for a power storage device according to claim 1, wherein the polymer particles include at least one copolymer selected from the group consisting of copolymers containing (meth)acrylate as a monomer, styrene-butadiene copolymer, and fluorine atom-containing copolymers.

12. The separator for a power storage device according to claim 1, wherein the polymer particles comprise a copolymer including (meth)acrylic acid, butyl (meth)acrylate and ethylhexyl (meth)acrylate as monomers.

13. The separator for a power storage device according to claim 1, wherein the polymer particles comprise a copolymer including a polyfunctional (meth)acrylate as a monomer.

14. The separator for a power storage device according to claim 1, wherein the polymer particles are primary particles.

15. The separator for a power storage device according to claim 1, wherein the heat shrinkage factor in the TD direction at 130° C. for 1 hour is 5% or lower.

16. The separator for a power storage device according to claim 1, wherein the heat shrinkage factor in the TD direction at 150° C. for 1 hour is 5% or lower.

17. A power storage device comprising a separator for a power storage device according to claim 1.

* * * * *